United States Patent [19]

Lipchak et al.

[11] Patent Number: 5,005,142
[45] Date of Patent: Apr. 2, 1991

[54] SMART SENSOR SYSTEM FOR DIAGNOSTIC MONITORING

[75] Inventors: John B. Lipchak, Forest Hills; Tod A. Oblak, Belle Vernon; Fred H. Bednar, Millvale; William Ciaramitaro, Murrysville; Francis R. Hughes, Verona; John R. Smith, Monroeville; Gregory A. Gisoni, Murrysville, all of Pa.

[73] Assignee: Westinghouse Electric Corp., Pittsburgh, Pa.

[21] Appl. No.: 386,008

[22] Filed: Jul. 24, 1989

Related U.S. Application Data

[63] Continuation of Ser. No. 10,504, Jan. 30, 1987, abandoned.

[51] Int. Cl.$^5$ .................. G21C 17/00; G05B 15/02
[52] U.S. Cl. .................. 364/550; 376/245; 376/259; 73/117.2; 364/138
[58] Field of Search .................. 364/550, 551.01, 556, 364/571.07, 138, 184, 186, 553, 724, 825; 73/112, 117.2, 767; 340/501; 376/207, 216, 217, 245, 259; 371/3, 22.5

[56] References Cited

U.S. PATENT DOCUMENTS

| | | | |
|---|---|---|---|
| Re. 31,750 | 11/1984 | Morrow | 364/550 |
| 4,000,461 | 12/1976 | Barber et al. | 364/572 X |
| 4,060,716 | 11/1977 | Pekral et al. | 376/259 X |
| 4,093,989 | 6/1978 | Flink et al. | 364/572 X |
| 4,184,205 | 1/1980 | Morrow | 364/550 X |
| 4,275,464 | 6/1981 | Schmidt | 364/477 X |
| 4,290,851 | 9/1981 | Ball et al. | 376/217 |
| 4,340,857 | 7/1982 | Fasang | 371/22.5 |
| 4,394,744 | 7/1983 | Wrench, Jr. | 364/553 |
| 4,414,638 | 11/1983 | Talambiras | 364/571.07 |
| 4,482,251 | 11/1984 | Saylor | 364/498 |
| 4,494,212 | 1/1985 | Muellner | 364/571.07 |
| 4,517,154 | 5/1985 | Dennis et al. | 376/259 |
| 4,630,224 | 12/1986 | Sollman | 364/550 |
| 4,639,901 | 1/1987 | Warmack et al. | 367/13 |
| 4,642,782 | 2/1987 | Kemper et al. | 364/550 |
| 4,663,586 | 5/1987 | Swerlein et al. | 324/115 |
| 4,674,089 | 6/1987 | Poret et al. | 371/22.5 X |
| 4,700,174 | 10/1987 | Sutherland et al. | 376/259 X |
| 4,703,325 | 10/1987 | Chamberlin et al. | 364/551.01 X |
| 4,740,349 | 4/1988 | Loftus et al. | 376/259 X |
| 4,751,648 | 6/1988 | Sears, III et al. | 364/550 X |
| 4,764,760 | 8/1988 | Bedard et al. | 364/474.17 X |
| 4,783,748 | 11/1988 | Swarztrauber et al. | 340/825.08 X |
| 4,804,515 | 2/1989 | Crew et al. | 376/216 |
| 4,831,558 | 5/1989 | Shoup et al. | 364/550 |

Primary Examiner—Joseph L. Dixon
Attorney, Agent, or Firm—M. G. Panian

[57] ABSTRACT

The present invention is a component monitoring system which includes all sensor and plant component monitoring at distributed plant locations close to the sensors which are the source of the signals to be analyzed. Minimally preconditioned analog sensor signals are multiplexed and further conditioned by a sensor signal preprocessor that adjusts the gain and filters the sensor signals before being applied to an analog-to-digital converter controlled by a data acquisition computer. The analog sensor signals are converted into digital samples and stored in a data memory of a digital signal processor using a direct memory access technique. The data acquisition computer also controls the selection of sensors, gain, etc., based on commands from a controller. The digital signal processor, once sufficient sensor data has been collected, performs appropriate processing using known digital signal processing techniques. This processed data is then sent to the controller for analysis to determine plant component condition. The analysis and processing routines can be changed by downloading a new routine from the controller. Once a sensor signal is processed, the controller selects the next sensor by transmitting an appropriate command to the data acquisition computer.

18 Claims, 24 Drawing Sheets

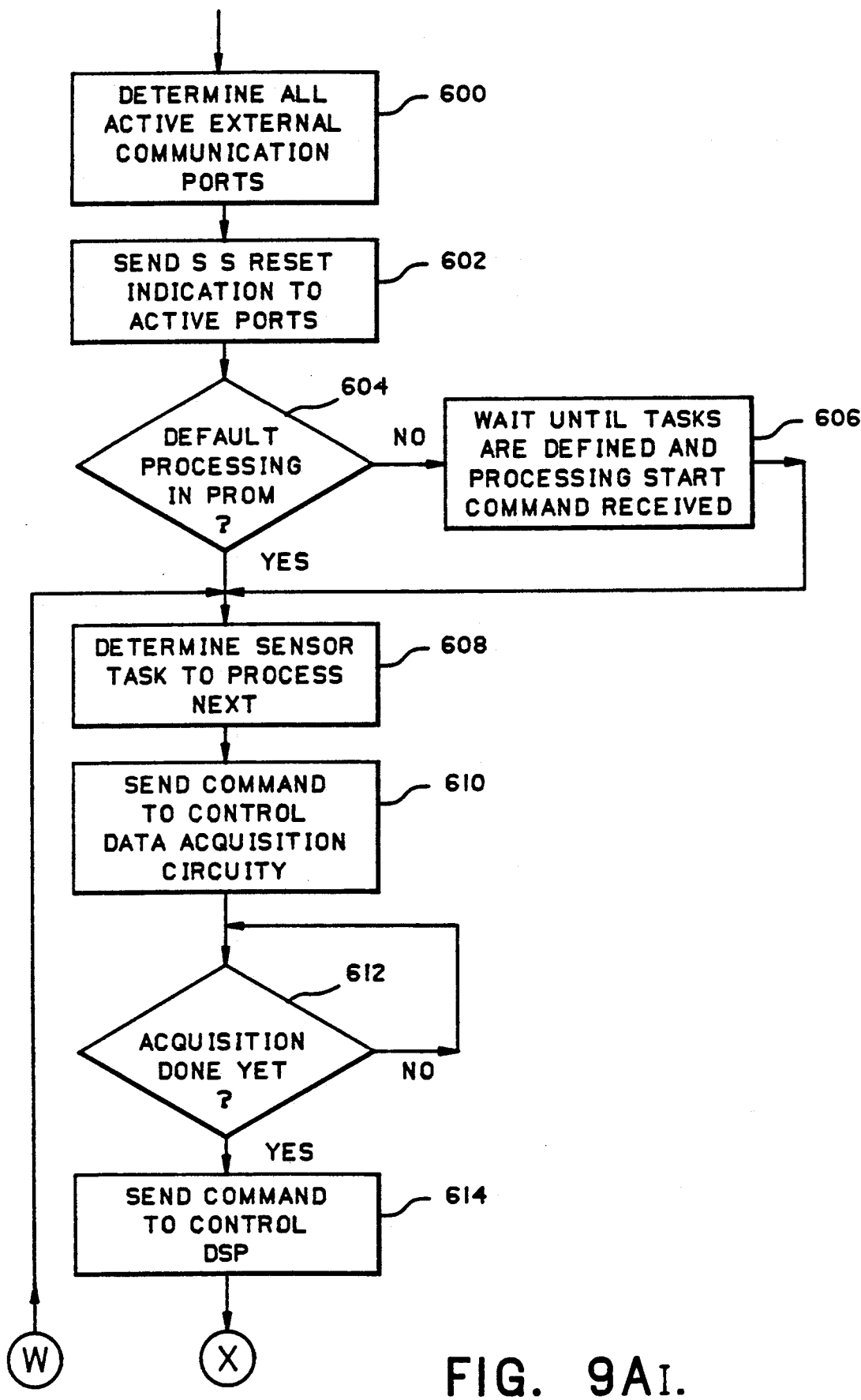
FIG. 9A1.

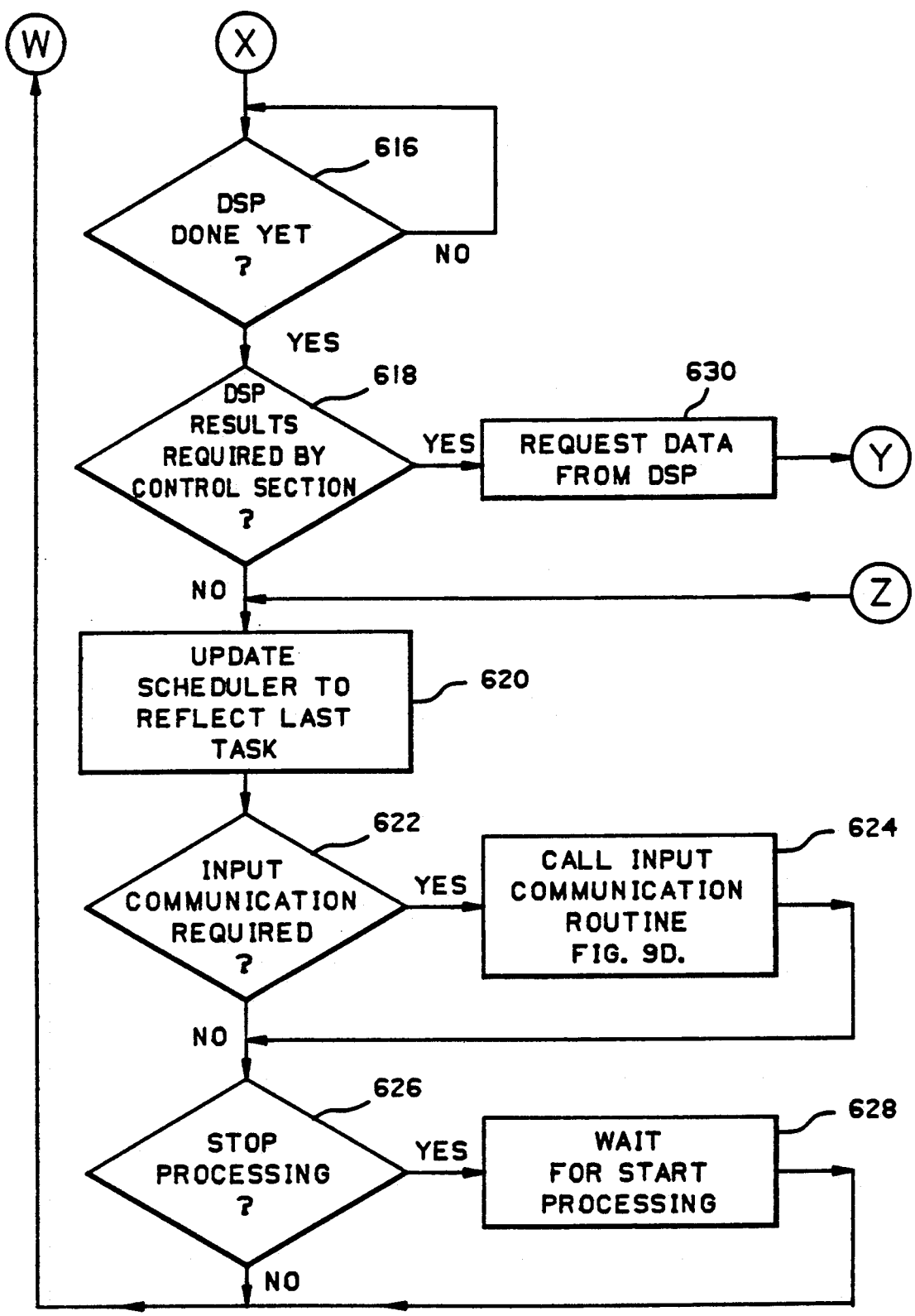
FIG. 9AII.

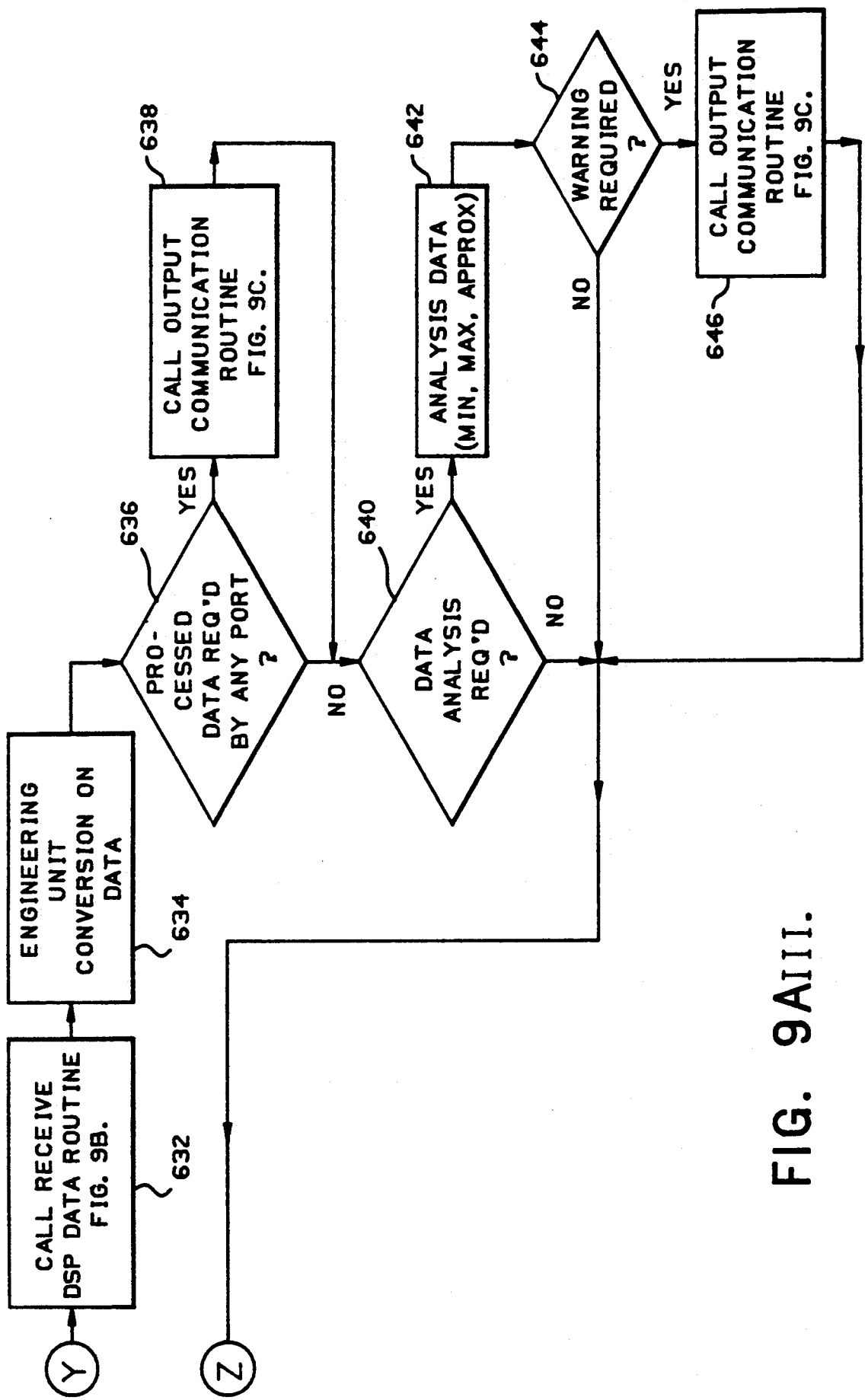
FIG. 9AIII.

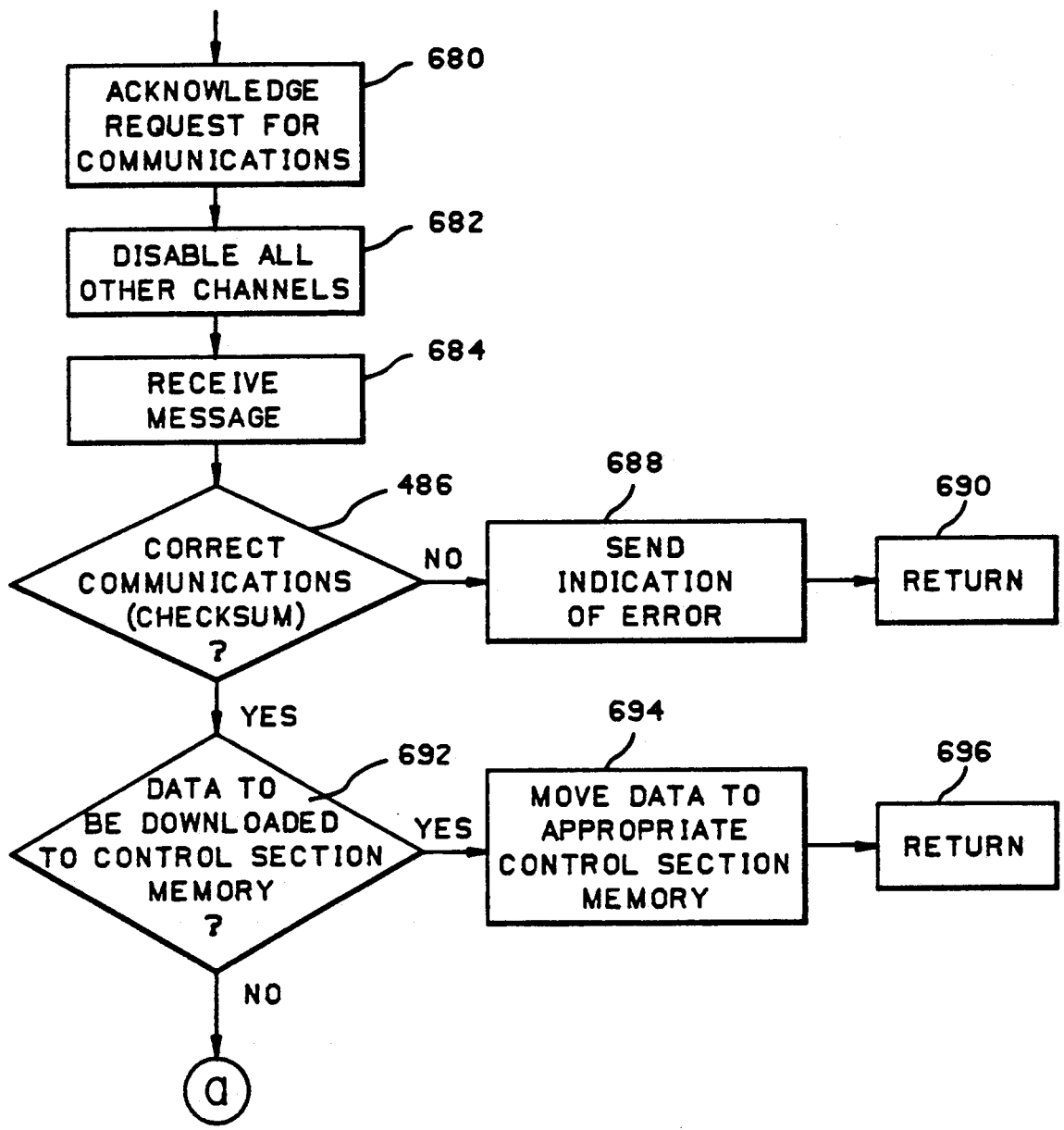
FIG. 9D I.

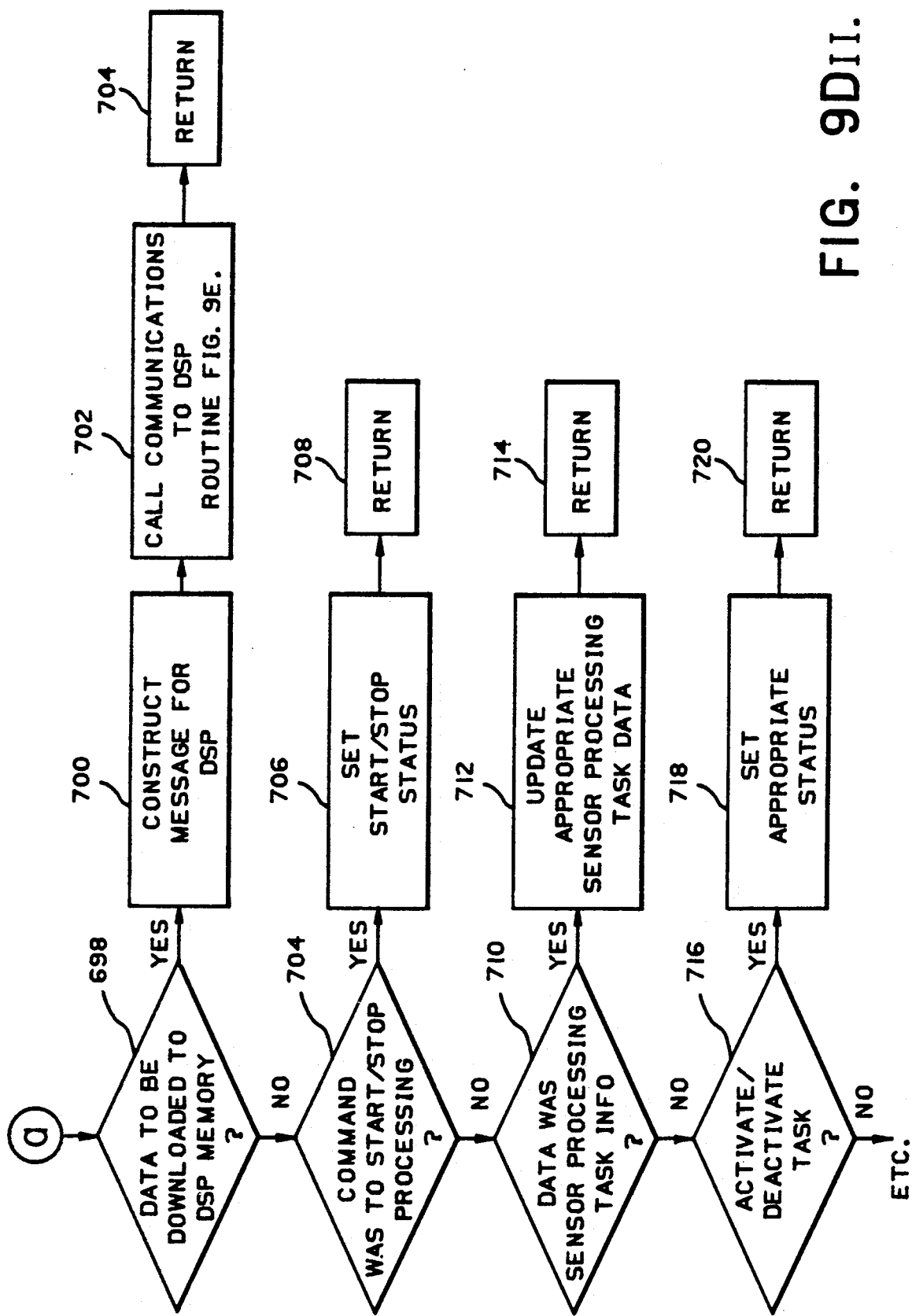
FIG. 9DII.

SMART SENSOR SYSTEM FOR DIAGNOSTIC MONITORING

This application is a continuation of application Ser. No. 06/010,504 filed Jan. 30, 1987 now abandoned.

BACKGROUND OF THE INVENTION

1. Field of the Invention

The present invention is directed to a distributed data acquisition, processing and analysis system which allows continuous diagnostic monitoring of sensors and alerts operators, via a remote processor, whenever a component being monitored by the sensors is abnormal, indicating an actual or potential failure without burdening the remote processor with detailed diagnostic signal processing and analysis.

2. Description of the Related Art

Component monitoring systems have traditionally been centralized systems in which a computer is directly connected to the remotely located sensors monitoring major plant components throughout a processing plant, such as a nuclear power plant. In these systems, the remote processor monitors the state of the sensors to determine the state of the components. In these traditional systems, the computer spends a relatively large amount of time processing and analyzing the sensor signals which limits the number of sensors/components that can be monitored. There are predominantly two methods currently used to implement plant component diagnostic monitoring. The first method involves the processing of all sensor data within the plant at a central location. The central monitor will process and analyze one sensor signal at a time and alert an operator when servicing is required. While such an installation has the advantage of having all of the extensive sensor processing and analysis equipment located at a convenient location, several disadvantages exist. Recent diagnostic algorithms depend on the conversion of sensor signals into a sequence of digital numbers to be analyzed using computationally intensive digital signal processing algorithms, such as spectral analyses. Even with the use of state-of-the-art digital computer systems, a limited number of sensors may be monitored at times when extensive digital signal processing algorithms are needed. Another disadvantage of implementing multisensor diagnostic monitoring with equipment located only at a central location is the cost of cabling for each sensor and the cost of implementing a multisensor data communication scheme with a drop for each sensor. Any cabling issue is of extreme importance for systems installed in an existing or new power plant. In addition, because wiring runs for sensors throughout a plant are of different lengths, signal conditioning circuitry with different signal conditioning parameters is necessary for each different sensor type, further exacerbating the maintenance problem.

A second method uses portable monitors, such as a computer or analog recording device, carried by service personnel throughout the plant to record data from component sensors. This method invests a significant amount of resources in service personnel, rather than capital equipment.

Diagnostic monitoring techniques for major plant components using a variety of sensors have proven valuable in achieving high availability and lowering maintenance costs of plant components such as pumps, valves and motors. Diagnostic monitoring typically involves recording certain processed quantities of the sensors when the component is known to be functioning properly and watching for changes in the quantities. These changes are observed well in advance of a failure and many times the exact problem may be diagnosed. A service organization using diagnostic monitoring will, therefore, have the opportunity to order the required parts and schedule maintenance before a failure occurs.

SUMMARY OF THE INVENTION

It is an object of the present invention to distribute component monitoring and diagnostic processing and analysis allowing a remote computer to devote its limited resources to diagnostic monitoring system control and operator interface.

It is another object of the present invention to improve diagnostic monitoring in process plants.

It is an additional object of the present invention to allow an increase in the number of sensors and, as a result, plant components that can be monitored by a single remote processor.

It is also an object of the present invention to provide a system that will allow the use of sophisticated sensor signal analysis techniques without sacrificing the ability to monitor many sensors and components.

It is a further object of the present invention to reduce maintenance costs associated with plant component monitoring systems.

It is still another object of the present invention to improve plant availability, reliability and life expectancy.

It is another object of the present invention to minimize plant wiring.

It is an object of the present invention to provide a system which will monitor at least two signals simultaneously.

It is a still further object of the present invention to facilitate plant component monitoring expansion.

The above objects can be attained by a smart sensor system which includes all plant component monitoring at distributed locations close to the component sensors which are the source of the signals analyzed. Minimally preconditioned analog sensor signals are multiplexed and further conditioned by a sensor signal preprocessing section that adjusts the gain of and filters the sensor signals before being applied to a data acquisition section. The data acquisition section also controls the selection of sensors, gain, etc., based on commands from a control section. The analog signals are converted into digital samples by the data acquisition section and stored in the data memory of a digital signal processing section using a direct memory access technique. The digital signal processing section, once sufficient sensor data has been collected, performs appropriate processing using known digital signal processing techniques. The processing routine can be changed by downloading new routines from the control section. Once processing is complete, the digital signal processor section communicates the results to the control section which determines whether the plant components are operating properly by analysis techniques such as comparing average sensor signals to a threshold. The control section can then send a warning message to the remote processor. Once a sensor signal has been processed, the control section selects the next sensor or pair of sensors by transmitting an appropriate command to the data acquisition section.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1, including

FIG. 2, including

DESCRIPTION OF THE PREFERRED EMBODIMENTS

Figure 1A:
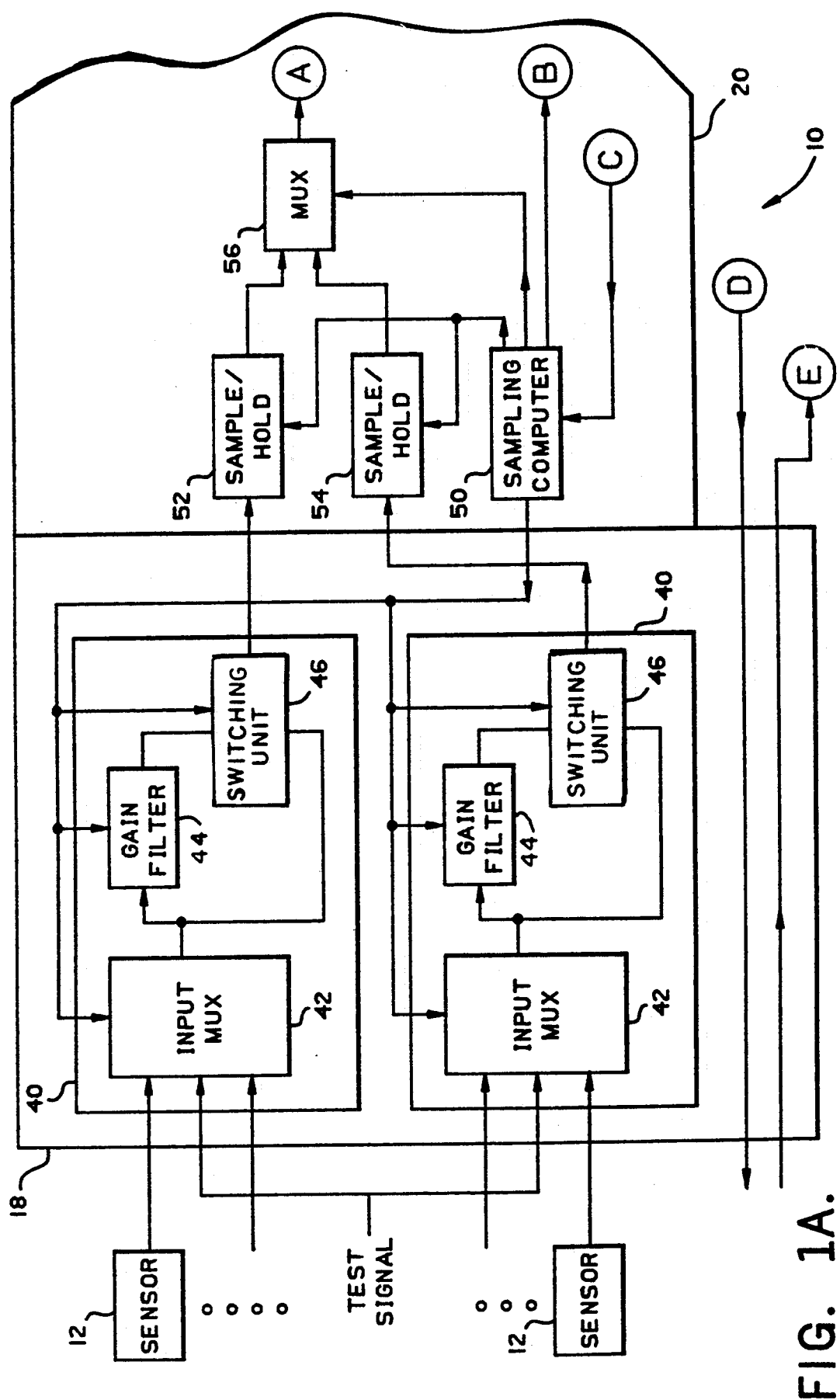
FIGS. 1A-1C, is a block diagram of the components of the smart sensor system 10.
Figure 1B:
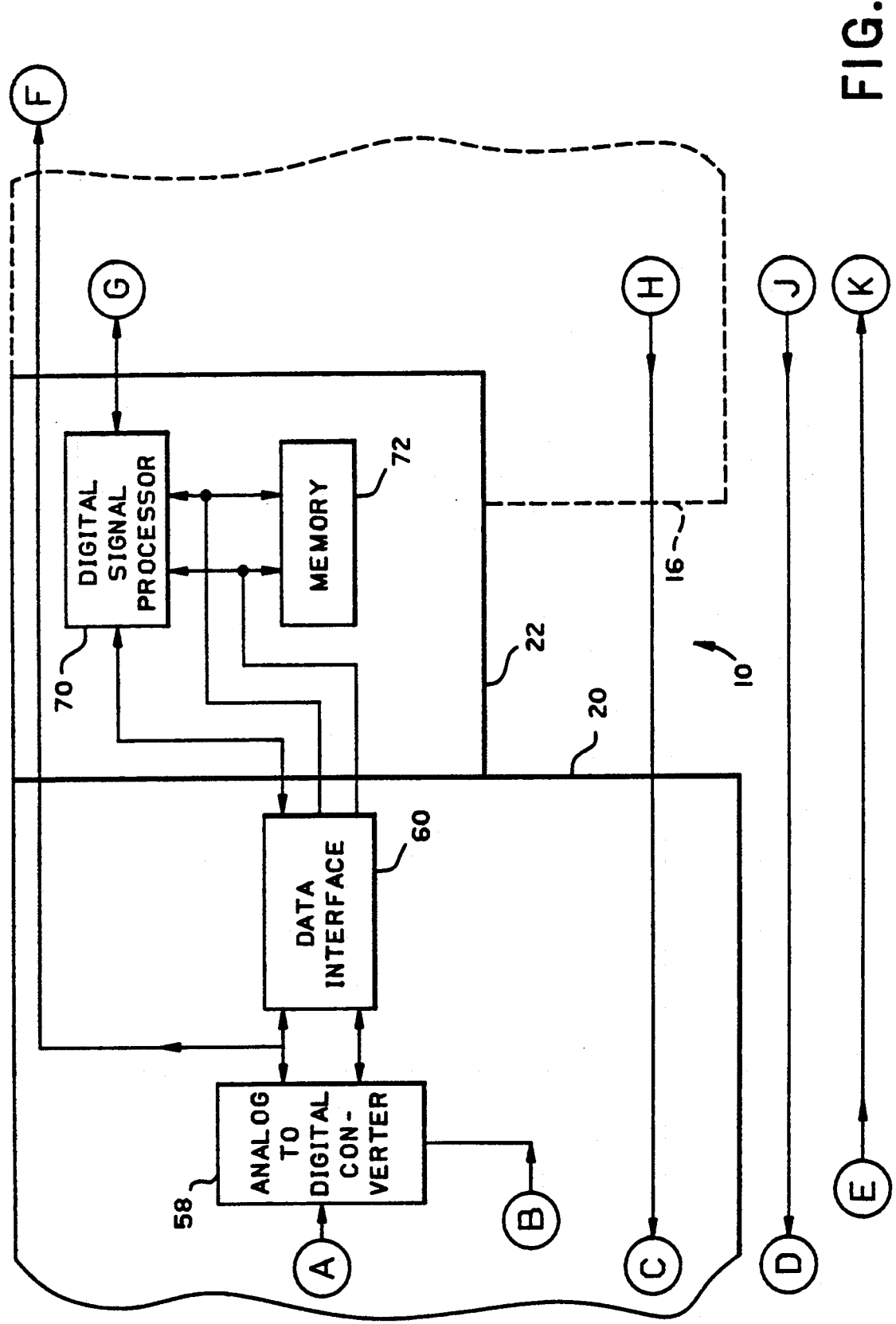
Figure 1C:
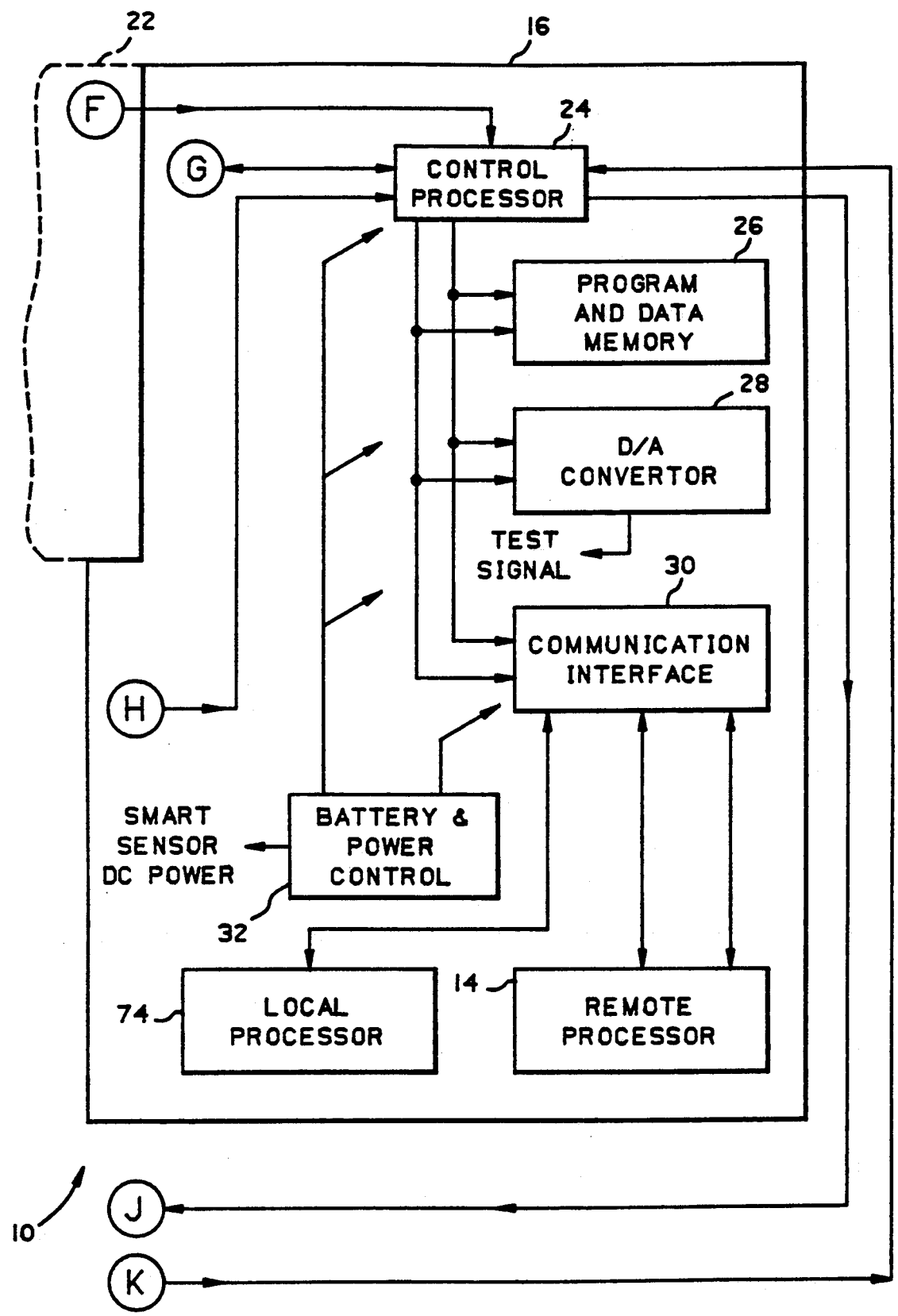

The smart sensor system 10, as illustrated in FIG. 1, including FIGS. 1A-1C, is positioned between component sensors 12 and a remote processor 14. The smart sensor system 10 acquires conditioned static and dynamic signals from analog, variable frequency or digital sensors 12 and locally performs the necessary signal processing and analysis to determine the condition of components monitored by the sensors 12. The smart sensor system 10 sends pertinent analysis results to the remote processor 14 which receives results from several different smart sensor system modules. The remote processor 14 is thereby relieved of the time-consuming task of sampling, processing and analyzing the sensor signals, thus increasing its diagnostic monitoring capability and flexibility. The smart sensor system 10 includes four different sections: a control section 16, a sensor preprocessing section 18, a data acquisition section 20 and a digital signal processing section 22.

The control section 16 (FIG. 1C) through commands produced by control processor 24, and transmitted to the other sections, controls all the interfacing and switching between sensors 12 as well as communications with the remote processor 14. The control section 16 includes program and data memory 26 for storing the control programs associated with controlling the smart sensor system 10 along with data memory for storing data to be transferred to the remote processor, or downloaded programs. A digital-to-analog converter 28 can produce a test signal which is applied to the sensor preprocessing section 18 to verify calibration of the data acquisition section 20 portion of the system 10. The control processor 24 communicates with the remote processor 14 through a communications interface 30. The control processor 24 also communicates with a local processor 74 through the communications interface 30. The local processor 74 is used by a maintenance technician to diagnose problems with the system 10 and sensors 12 or in an application where no remote processor 14 is used and data will periodically be retrieved from the smart sensor system 10. The processor 25 can also communicate over a sensor data highway. The sensor highway allows communication between several smart sensor systems 10 and the remote processor 14 over a single communication link, thus, further minimizing long field cable runs and facilitating expansion. The control processor 24 communicates locally with the digital signal processing section 22 and the data acquisition section 20 over local parallel and serial data buses, respectively. The control processor 24 can receive downloaded programs from the remote processor 14 or the local processor 74 and load those programs into its own memory or the digital signal processor section memory 72. The control processor 24 also commands the digital signal processing section 22 and data acquisition section 20 to make operational mode changes.

The sensor preprocessing section 18 (FIG. 1A) is responsible for routing to and conditioning the sensor signals for the data acquisition section 20. The sensor preprocessing section 18 includes at least two sensor processing modules 40, each capable of conditioning the signals from plural sensors 12. The sensors 12 are connected to input multiplexers 42 which apply a selected sensor signal to an adjustable gain low pass filter 44 having gain and filter characteristics enabled by a switching unit 46. The gain and cutoff frequency of the filter 44 are adjusted by digital control words from the data acquisition section 20. Digital pulse sensor signals and variable frequency digital sensor signals, such as from a tachometer are fed directly through the sensor preprocessing section 18 to the control processor 24. The control processor 24 monitors these types of signals directly.

The data acquisition section 20 (FIGS. 1A & 1B), under the control of a sampling control computer 50, samples and holds the sensor signals using sample and hold circuits 52 and 54. The outputs of the sample and hold circuits 52 and 54 are applied to a multiplexer 56, the switching of which is controlled by the sampling control computer 50. The multiplexer 56 is fixed to one position when the acquisition of one sensor signal is required and is toggled once for each sample to enable the acquisition of two different sensor signals when time correlation is required. The output of the multiplexer 56 is applied to an analog-to-digital converter 58 which converts the analog signals into digital samples. The digital samples are transferred to the digital signal processing section 22 through a data interface 60 which performs a direct memory access transfer of the one or two channels of sampled sensor data into the memory 72.

The digital signal processing section 22 (FIG. 1B) includes processor 70 which digitally processes the sample data stored in memory 72 based on commands from the control processor 24. The digital signal processor 70 will perform operations such as filtering, spectral analysis, correlation, comparisons, etc., in accordance with well-known digital signal processing algorithms, such as described in Oppenheim et al., *Digital Signal Processing*, Prentice-Hall, 1975, incorporated by reference herein. The results of the data processing operations are sent to the control processor 24 which will analyze the data and determine if abnormal conditions are present using well-known diagnostic techniques such as described in *Vibration Signature Analysis and Acoustic Emission Monitoring at Brayton Point*, EPRI Report No. EPRI CS-1938, incorporated by reference herein, which compare expected sensor and component values with actual values. If an abnormal condition does occur, the control processor 24 alerts the remote processor 14 through the interface 30 or alternatively, alerts the local processor 74 when it is connected to the local port of the communications interface 30.

The smart sensor system 10 is capable of operating in five different modes. The remote command mode and the local command mode involve the interactive control of the system via an external device, such as the remote processor 14, or the local processor 74 which provides control commands through the communication interface 30. The normal, variable speed mode and transient mode are stand-alone modes of operation which monitor the plant components and communicate messages to the processor 14 only when abnormal sensor signal conditions are observed.

The remote command mode is activated by the receipt of a command from the remote processor 14 over the high speed remote processor port or the sensor data highway. If the command is followed by data, it is either software to be entered into the memory 72 or variables which control the operations performed on data associated with each sensor 12. The commands can direct the smart sensor 10 to perform sensor related operations or to communicate results of such operations to the remote processor 14.

The local command mode operations are similar to those of the remote command mode except that control commands are provided by a local processor, such as a portable computer, through the local control port of the communications interface 30. The local processor can be a portable digital computer used as a portable recorder and/or as a service/calibration device. While in the local command mode, the remote command mode is disabled.

The normal mode, which is the prevalent mode, operates while the plant components are in a steady state condition and the command modes are not active. When the control processor 24 observes one of several predefined abnormal sensor signal conditions which could signify the occurrence of a failure or of an impending failure, the control processor 24 will alert the remote processor 14 which may, in turn, initiate the remote command mode so that the remote processor 14 can directly control monitoring of a component in distress, if desired. The normal mode, in general, relieves the remote processor 14 of the time-consuming task of direct sensor data monitoring.

The variable speed mode is activated from an external controller or by detection of changes in, for example, a tachometer signal in variable speed plant components. This monitoring mode results in the execution of special signal processing and analysis routines which monitor the component sensors 12 at the predefined speeds or speed increments. The results of the analysis are generally made available to the remote processor immediately.

The transient mode is activated whenever the control processor 24 recognizes a particular trigger event. A trigger event would either be a change in a digital input signal or an abnormal change in the state of a component sensor signal. In this mode, the sampling of the sensed signal would occur more often, and the results of special sensor signal processing would be made available immediately to the remote processor 14.

Figure 2A:
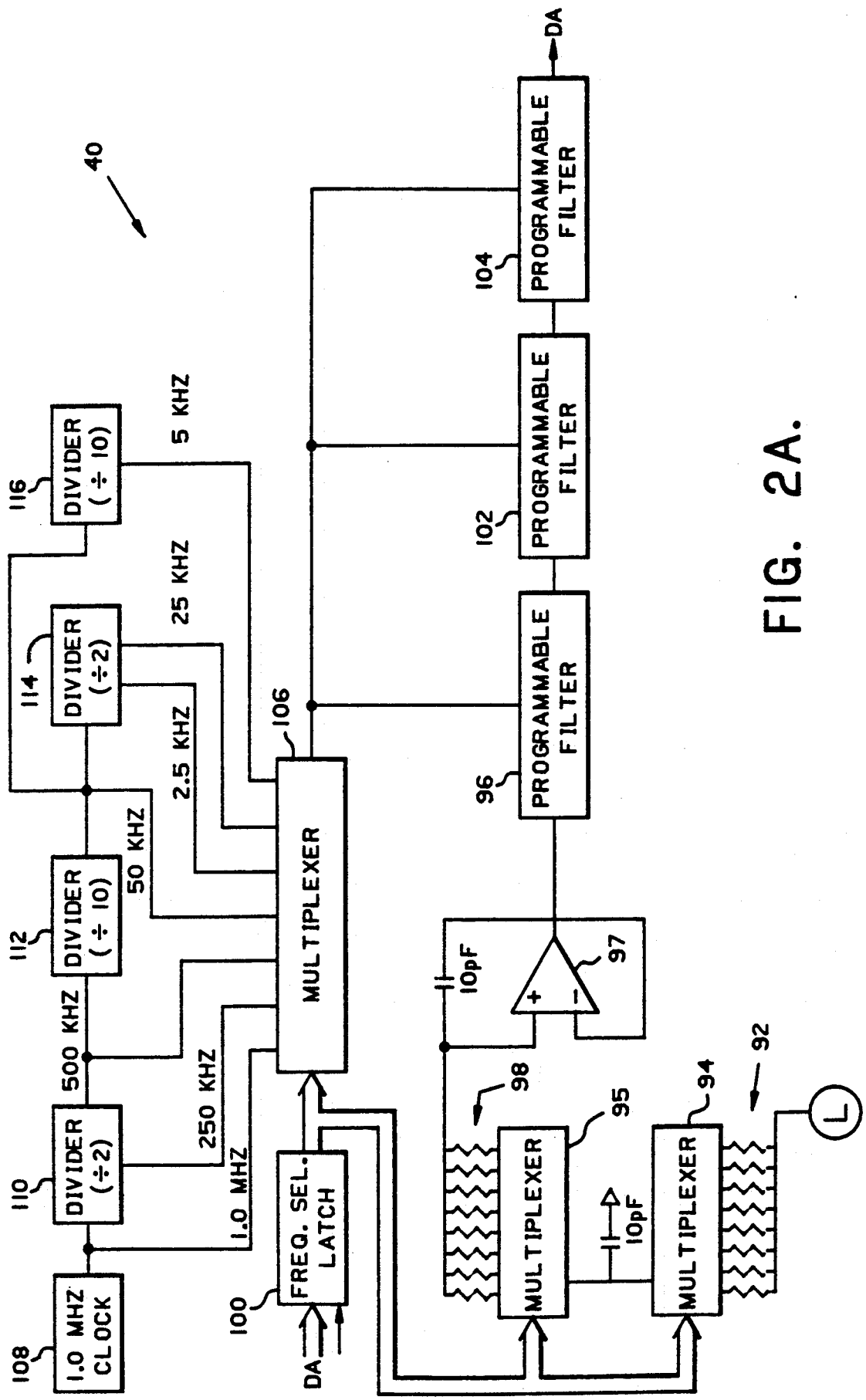
FIGS. 2A and 2B, is a detailed diagram of one of the signal conditioning units 40 of FIG. 1.
Figure 2B:
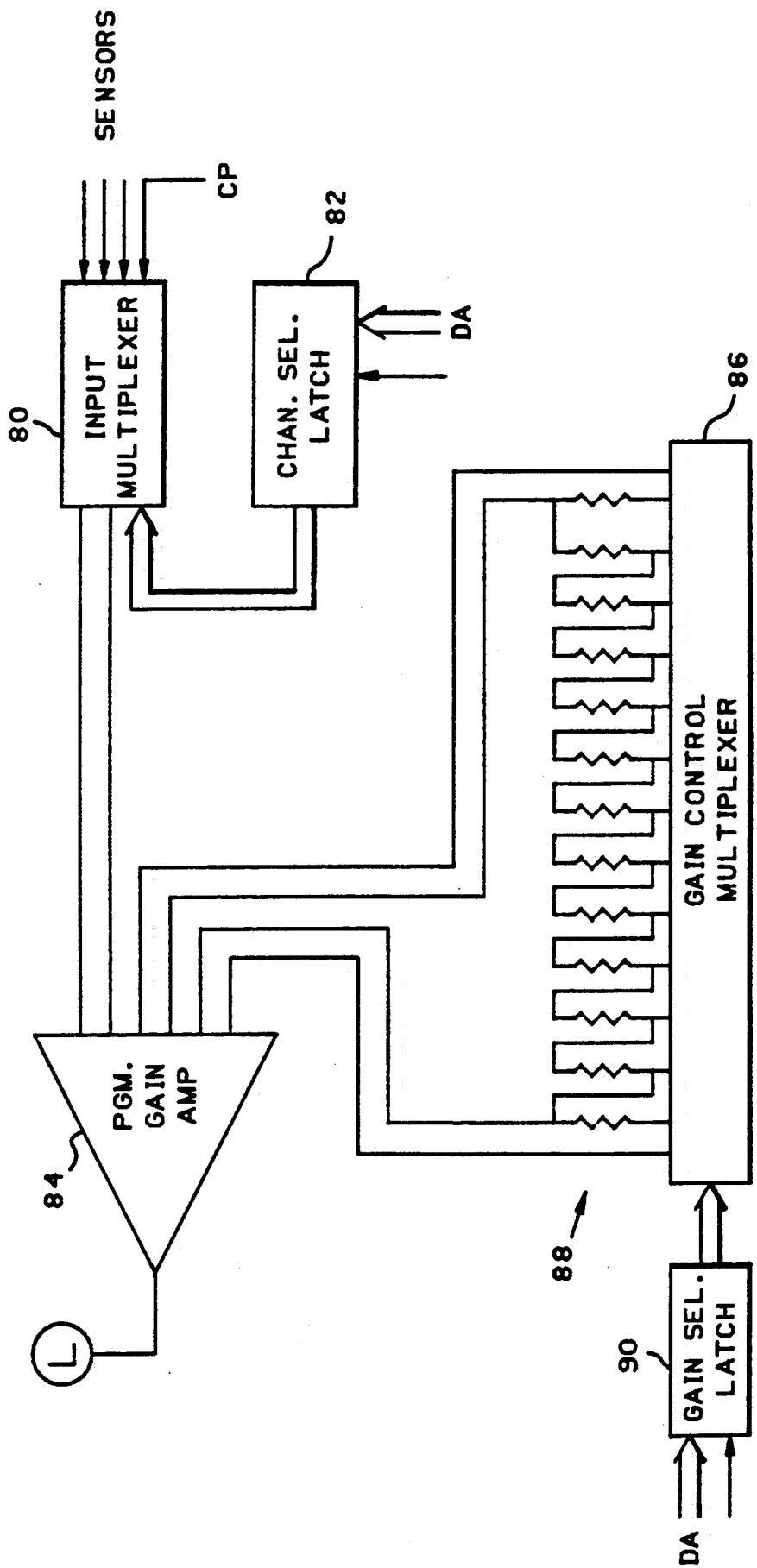

FIG. 2, including FIGS. 2A and 2B, illustrates the details of one of the sensor preprocessing modules 40 of FIG. 1. This module 40 provides a dynamic range of 72dB and a rolloff of 10dB within one octave of the cutoff frequency. An input multiplexer 80 (FIG. 2B) selects one of seven analog sensor signals or a test signal based on channel selection signal stored in channel selection latch 82. The channel selection bits are supplied by the sampling control computer 50 of the data acquisition section. A suitable input multiplexer AD7507 is available from Analog Devices and a suitable latch 74HC373 is available from National Semiconductor. The differential sensor signals are applied to a programmable gain control amplifier, such as an AD625 amplifier from Analog Devices. The gain of the amplifier 84 is set by a gain control multiplexer 86, such as an AD7507, through a resistor network 88. The resistor network 88 is a symmetrical network having resistors of the following resistance: 20 K, 10 K, 4.99 K, 2.49 K, 1.24 K, 619, 1.24 K, 619, 1.24 K, 2.49 K, 4.99 K, 10 K and 20 K. The gain control multiplexer 86 is controlled by a gain selection latch 90 which receives bits from computer 50 and can be a 74HC373 latch. The output of the programmable gain control amplifier 84 is applied to a resistor array 92 attached to a multiplexer 94 (FIG. 2A). The multiplexer 95 outputs a differential signal to a first programmable filter 96 through an amplifier 97 and a resistor array 98. The multiplexers 94 and 95 can be AD7507 multiplexers while the resistor arrays 92 and 98 each include resistors having values of: 255 K, 127 K, 6.4 K, 31.6 K, 15.8 K, 7.68 K, 3.74 K and 1.69 K. The amplifier 97 can actually be the first stage amplifier of the filter 96. The selection of input 92 and output 98 resistors by multiplexers 94 and 95 is controlled by a frequency selection latch 100, such as a 74HC373, which receives frequency selection control bits from the sampling control computer 50 of the data acquisition section 20. The sensor signal is filtered by lowpass programmable 6-pole filters 92, 102 and 104, such as MF6-50 filters available from National Semiconductor or the more stable MF60 version. The cutoff frequency and roll off characteristics of the programmable filters 96, 102 and 104 are controlled by a clock signal produced by a multiplexer 106 such an RCA 74HC4051. The clock frequency is 50 times the cutoff frequency. The multiplexer 106 selects from various clock signals provided by a one megahertz clock 108, such as an X0-438 available from Dale and dividers 110–116, such as MM74HC73 and MC14018B available from Motorola.

Figure 3:
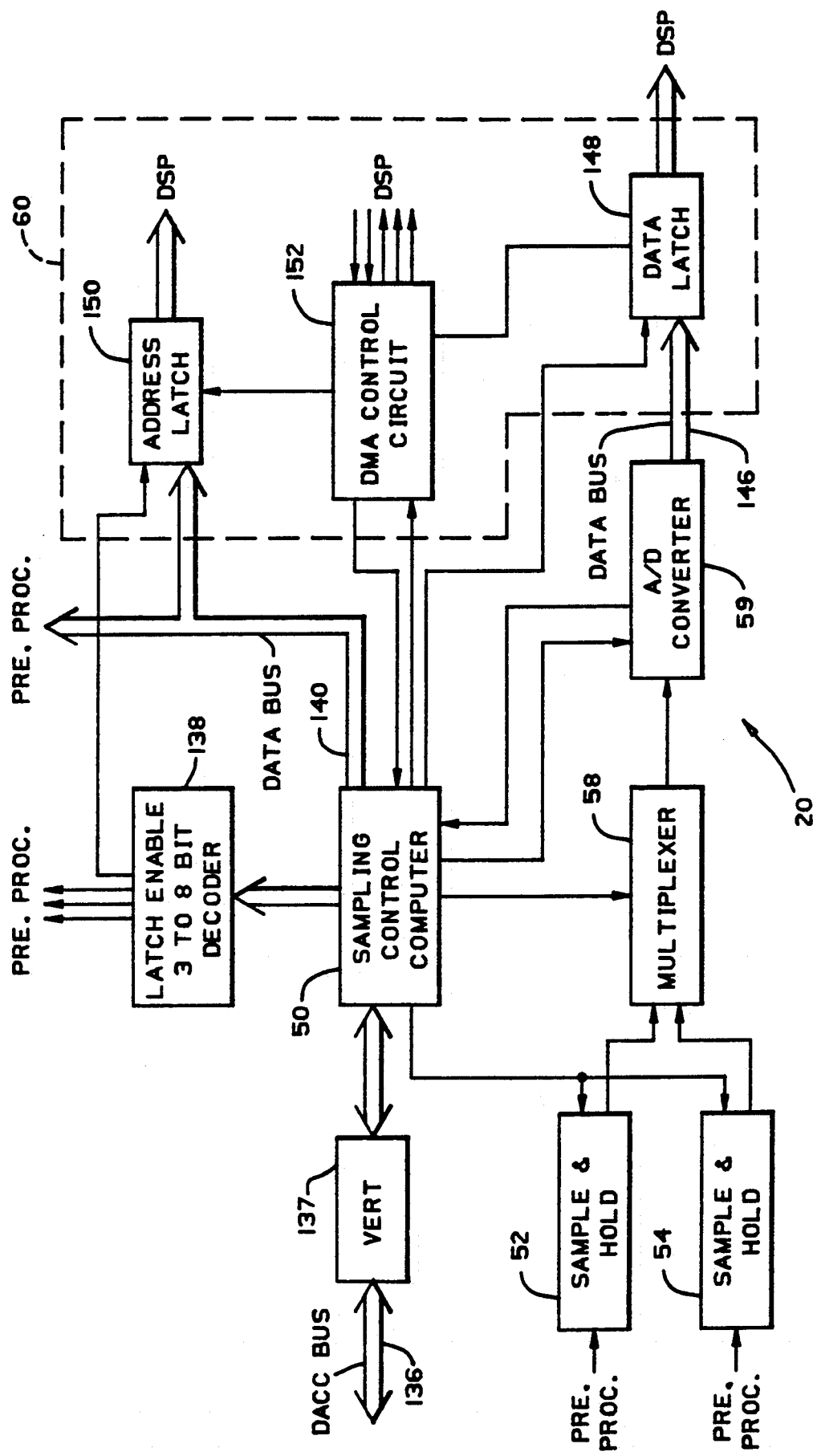
FIG. 3 illustrates the details of the data acquisition section 20 of FIG. 1.

The filter and gain controlled sensor signal is applied to one of the sample and hold circuits 52 and 54 of FIG. 3, which are available as an AD585 from Analog Devices. The sample and hold pulse is generated by the control processor 24. The sampling control computer 50, such as an 8751 from Intel, receives the commands and the sampling clock signal from the control processor 24 over a data acquisition control channel bus 136 through a commonly available UART 137. The sampling control computer 50, through a latch enable decoder 138, latches the channel, gain and frequency selection bits sent over the data bus 140 applied into the latches 82, 90 and 100 of the sensor preprocessing section 18. The decoder 138 is a known 3 to 8 bit decoder. The sampling computer 50 also controls multiplexer 56 which can be a 4053 multiplexer available from Motorola, to select a sample to be applied to the analog-todigital converter 58. The A/D converter 58 can be an AD7572 available from Analog Devices.

The start of a conversion is controlled by the sampling control computer 50 and when the A/D converter 58 is finished with a conversion, it indicates same to the sampling control computer 50. The output of the A/D converter 58 is transferred over databus 146 to a data latch 148, such as a 74HC373. The computer 50 also outputs an appropriate address, based on a starting address received from the control processor 24 over the data acquisition control channel 136 that is stored in address latch 150 which can also be a 74HC373 latch. After data and an address are stored in latches 148 and 150, direct memory access (DMA) control circuit 152 is activated to transfer the data in latch 148 to a memory location in the memory 72 of the digital signal processing section 22 designated by the address in latch 150. The DMA transfer may operate at a transfer frequency of 200 KHz, the maximum sampling rate of the converter 58. When the direct memory access transfer is accomplished, the DMA control circuit 152 notifies the sampling control computer 50.

Figure 4:
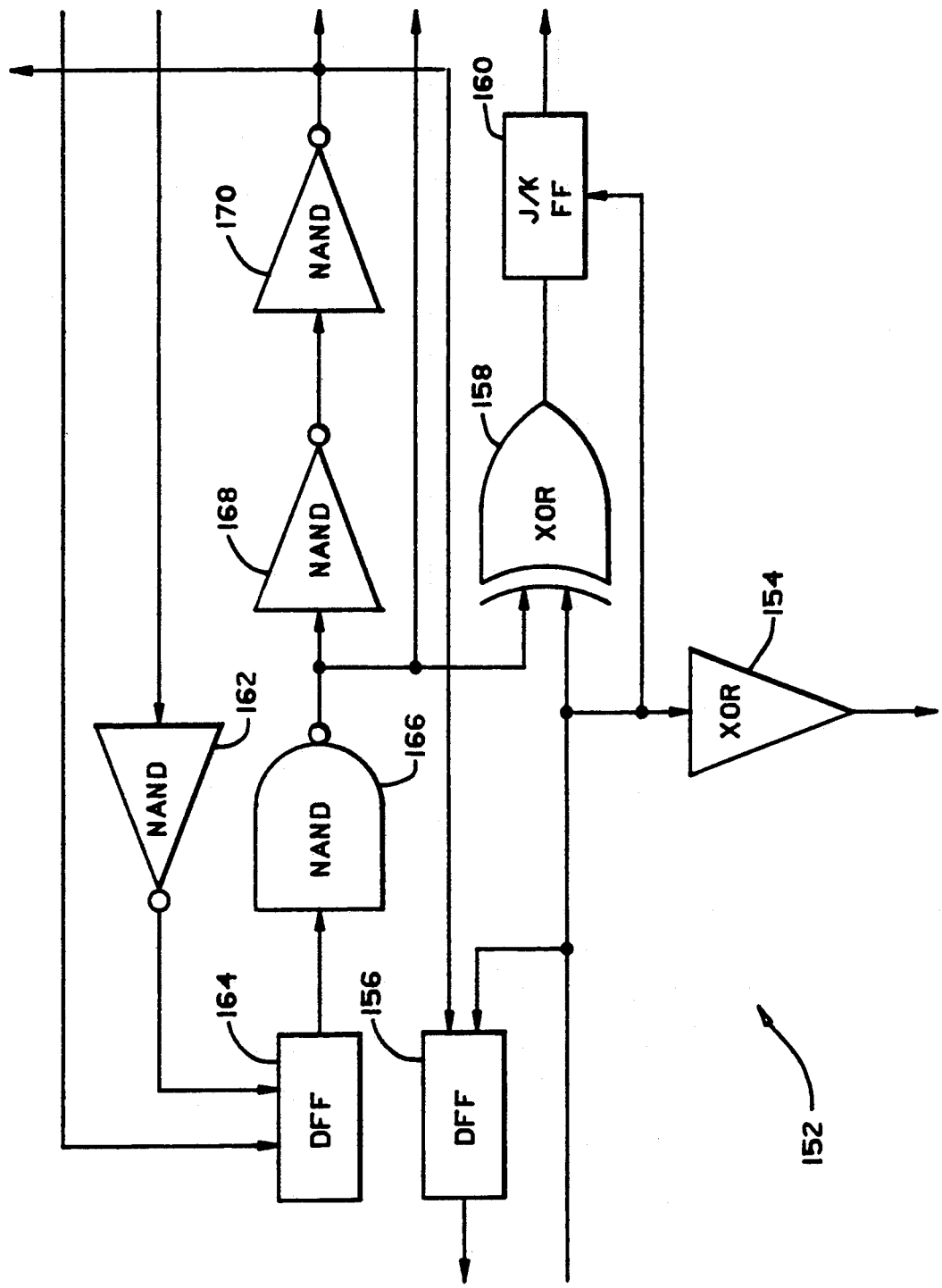
FIG. 4 illustrates the details of the direct means access control circuit of FIG. 3.
Figure 5A:
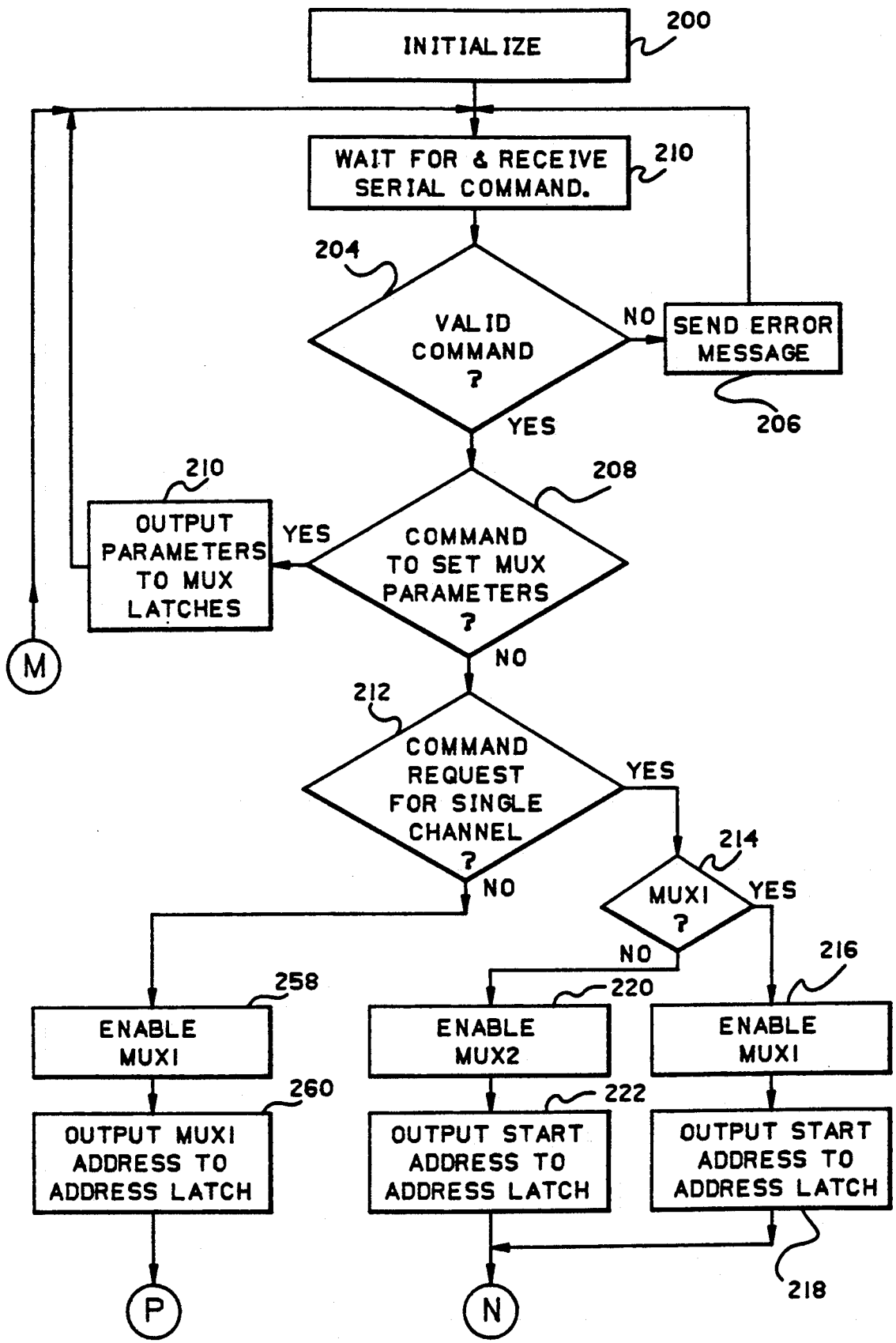
FIGS. 5A-5F depict the process performed by the sampling control computer 50 of FIG. 3.
Figure 5B:
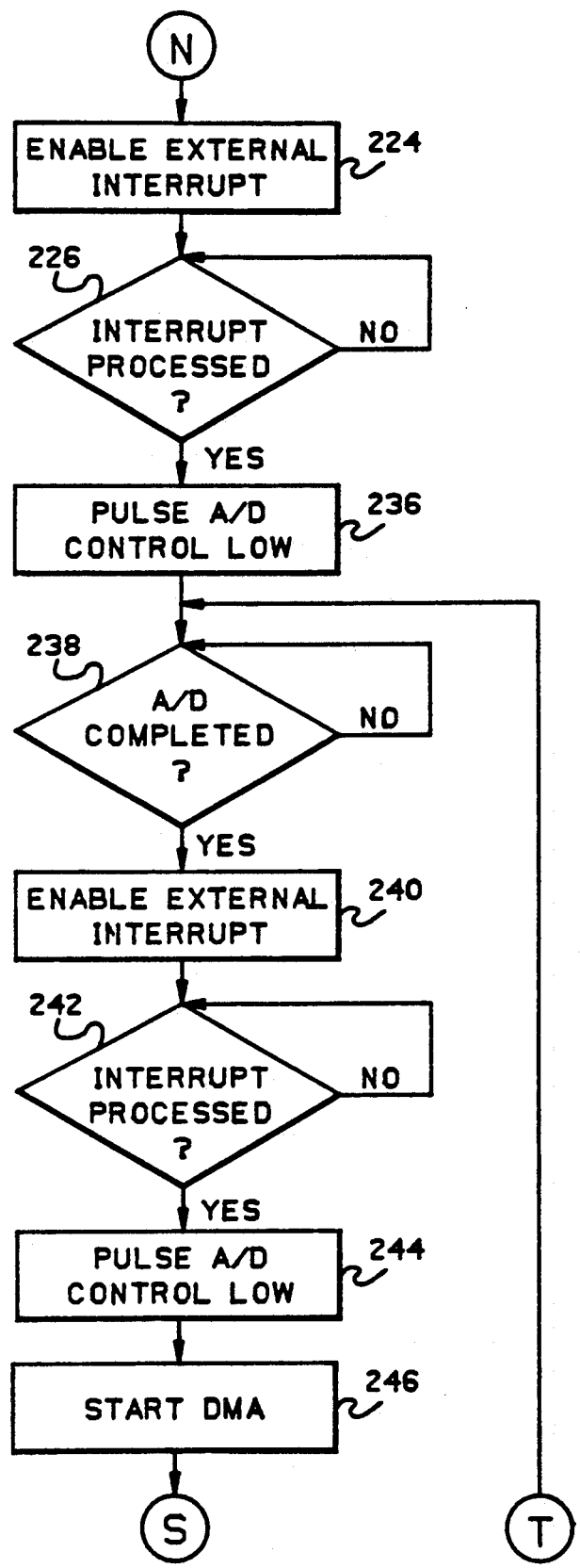
Figure 5C:
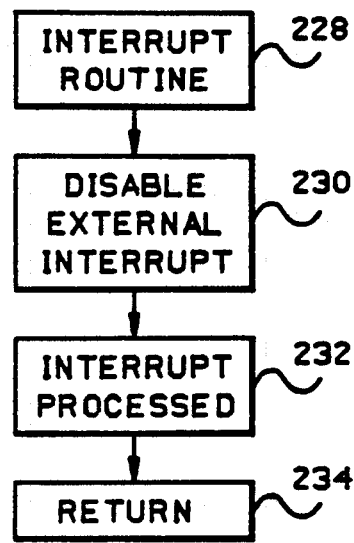
Figure 5D:
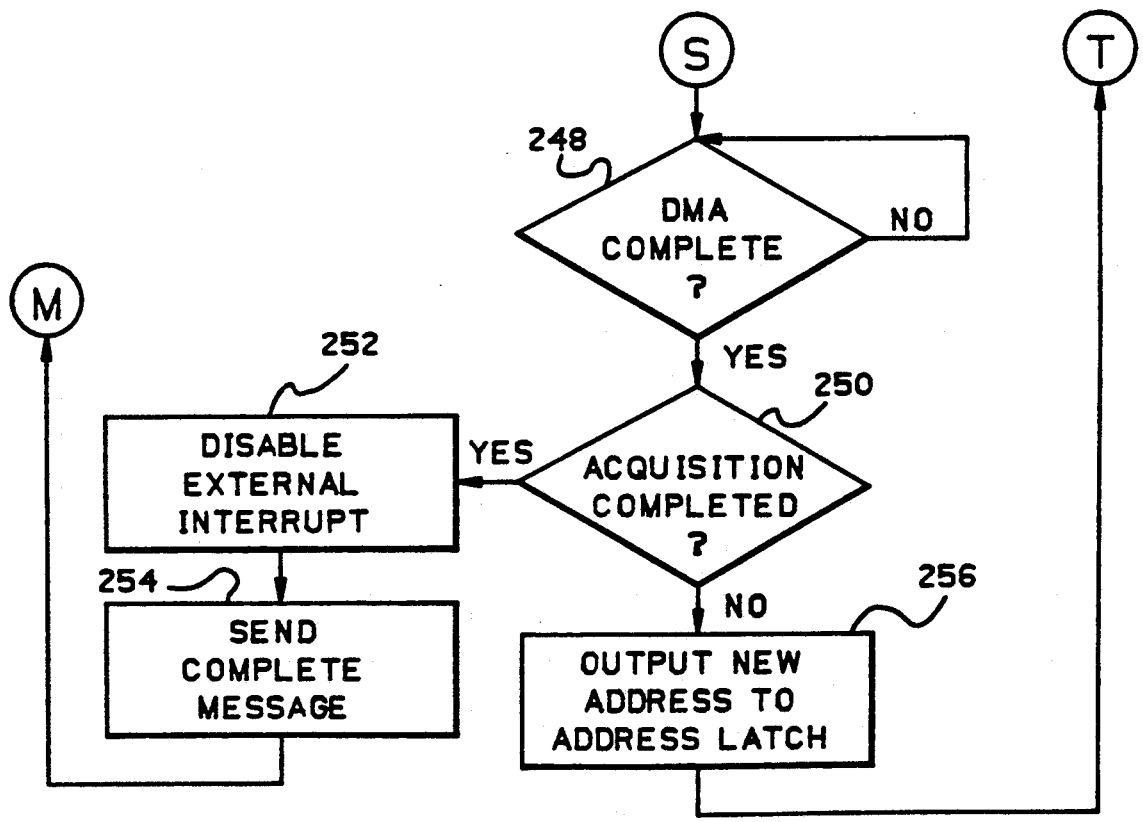
Figure 5E:
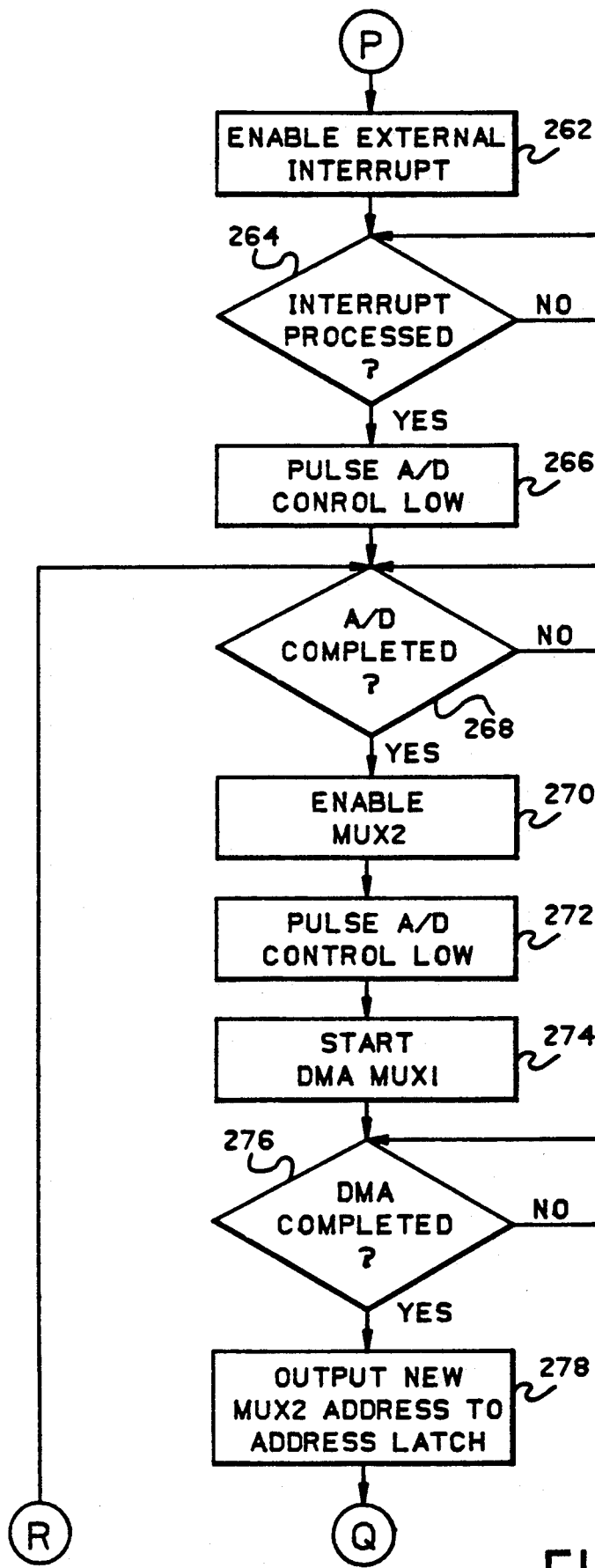
Figure 5F:
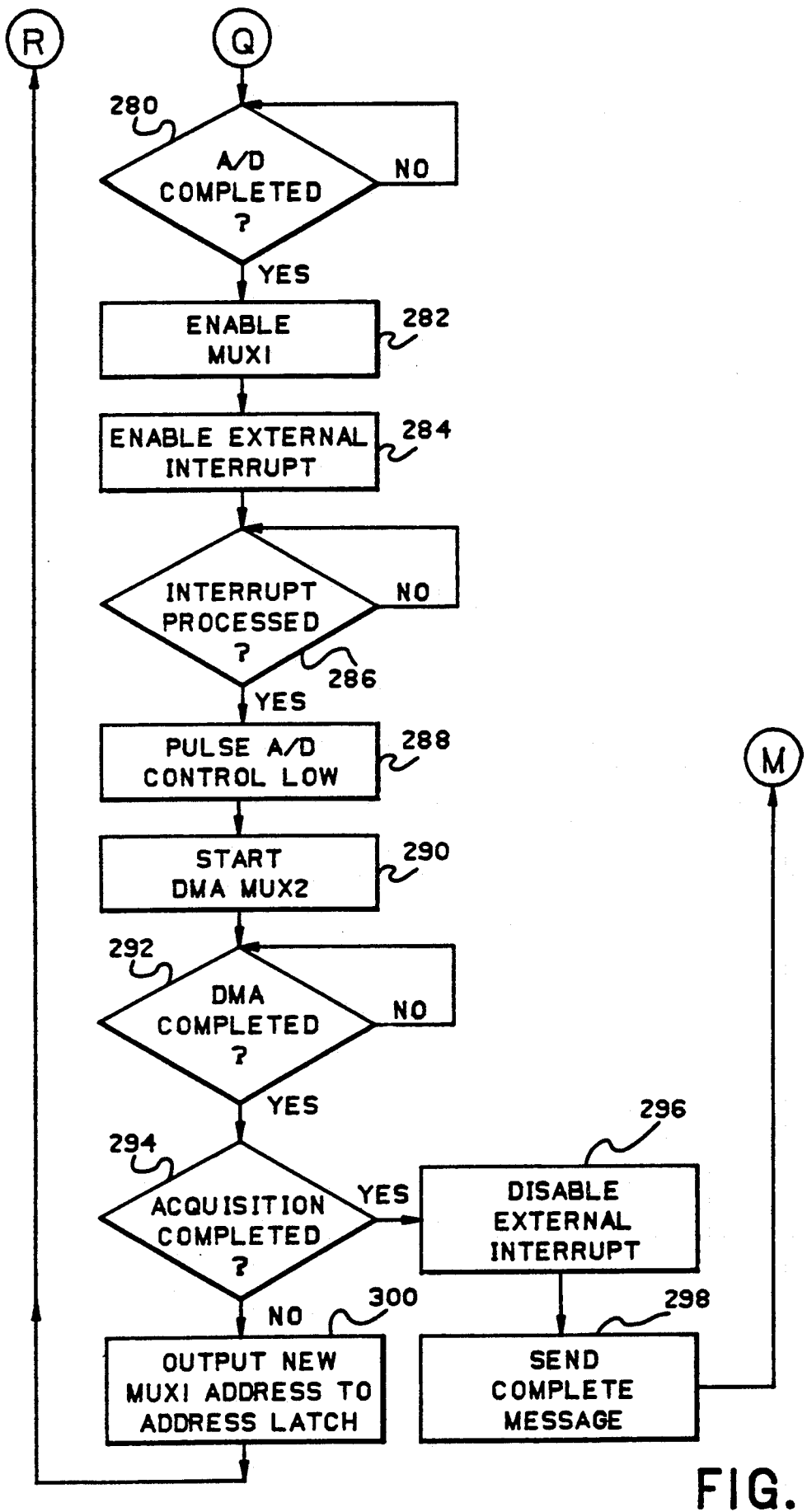

The details of the DMA control circuit 152 are illustrated in FIG. 4. When a DMA start signal is applied to the DMA control circuit 152, an output latch enable signal to data latch 148 is generated by an inverter circuit 154 and D flip-flop 156 is reset to indicate back to the sampling control computer 50 that the direct memory access is in progress. The DMA start signal is applied through exclusive OR circuit 158 to a JK flip-flop 160 which outputs a hold request signal to the digital signal processor 70. When the hold acknowledge signal is applied through inverter 162 to D flip-flop 164 after a delay, NAND gate 166, followed by inverters 168 and 170 produces DMA write enable and DMA chip select signals applied to the memory 72 of the digital signal processing section 22 and these signals must have a width of at least approximately 100 nanoseconds. This width is assured by the clocking of the clock-out 1 signal from the processor 70 by the D flip-flop 164. The output of inverter 170 also activates the output of address latch 150 and data latch 148 and acknowledges that the DMA transfer has been accomplished by resetting D flip-flop 156. When the clock signal associated with the completion of the transfer is applied to D flip-flop 164, it is reset, thereby presetting JK flip-flop 160 and allowing the processor 70 to resume normal operation.

FIG. 5, including FIGS. 5A-5F, depicts the process performed by the sampling control computer 50. When the processor 50 is initialized 200 (FIG. 5A) by a common reset in the smart sensor 10, the processor 50 waits 202 for the receipt of a command over the serial lines of the data acquisition control channel bus 136. A determination is made 204 concerning whether the command is valid and if not, an error message is sent 206 to the control processor 24. If the command directs the setting of the frequency selection and gain control settings of the sensor preprocessing section 18, the process outputs 210 the appropriate values. Next, a determination is made 208 concerning whether the command is for the sampling of a single channel or dual channels. If the command indicates single channel sampling, a determination is made 214 concerning whether the command indicates that the sample and hold circuit 52 (the first channel) should be used as the input to A/D converter 58. If so, the first multiplexer channel is enabled 216, followed by the output of the starting address 218 to the address latch 150. The starting address is part of a sensor sampling command received from the control processor 24 over the data acquisition and control channel bus 136. If the second channel is selected it is enabled 220 followed by the output of the start address 222. Next, external interrupts are enabled 224 (FIG. 5B) followed by a loop 226 which is waiting for the setting of a Boolean variable by the interrupt routine 228. This interrupt routine 228 (FIG. 5C) merely disables 230 the external interrupt, sets 232 a boolean variable, indicating the presence of the sample clock signal from the control section 16 at the external interrupt pin, and returns 234.

Next, the A/D converter 58 is activated 236 (FIG. 5B), the output of the converter is stored in latch 148 and the computer 50 awaits 238 the completion of the conversion. The external interrupt is enabled 240 followed by a wait 242 for the sample clock interrupt. The arrival of the second sample clock allows the A/D converter 58 to be started 244 at the same time the previous conversion is latched into data latch 148. After the converter 58 is started, a DMA transfer can be started 246. When the DMA is complete 248 (FIG. 5D), a determination is made 250 concerning whether the number of data points commanded by the control processor 24 have been taken. If so, external interrupts are disabled 252 followed by an indication 254 to the control processor 24 that the sampling is complete. This indication allows the control processor 24 to send a command to the digital signal processing section 22, staring signal analysis, and to send a command to the data acquisition section 18 to sample another sensor. If all of the samples have not yet been obtained, a new direct memory access transfer address is output 256 to the address latch 150 followed a return to the top of the sampling loop.

If dual channel sampling is to occur, the process is substantially the same as previously discussed with respect to a single channel except that alternate inputs of multiplexer 58 are selected while alternate addresses for the direct memory address transfer are applied to address latch 150. The dual channel sampling command includes two starting addresses for DMA storage.

First, multiplexer channel 1 is enabled 258 (FIG. 5A) followed by the storage 260 of the starting address in latch 150. Next, (FIG. 5E) external interrupts are disabled 262, followed by a wait 264 for the sample clock signal. Next, the A/D converter is started 266 while the latch 148 is activated to obtain a fresh sample so that the invalid previous sample associated with start up, is thrown out. When the conversion is complete 268 the multiplexer 56 is enabled 270 to transfer the sample from the sample and hold circuit 54 to the converter 58. The converter 58 is activated 278 (which includes activation of latch 148) followed by the start 274 of the DMA transfer for the previous sample obtained from sample and hold circuit 52. When the DMA is complete 276, a new address for the output of multiplexer channel 2, which is connected to the sample and hold circuit 54, is output 278. When the previously activated conversion is complete 280 (FIG. 5F), multiplexer channel 1 for sample and hold circuit 52 is enabled 284. Then external interrupts are enabled 284 followed by the interrupt wait loop 286 which awaits the sample clock signal. When the sample clock signal arrives, the converter 58 is started 288 followed by the DMA transfer 290 of the sample from multiplexer channel 2. When the DMA transfer is complete 292, a determination is made 294 concerning whether all the samples have been acquired and, if so, external interrupts are disabled 296 and a sample completion message is sent 298 to the control processor 24. If the sampling of data is not complete, a new address indicating the location for storing the sample from the multiplexer 1 is stored 300 in the latch 150.

Figure 6:
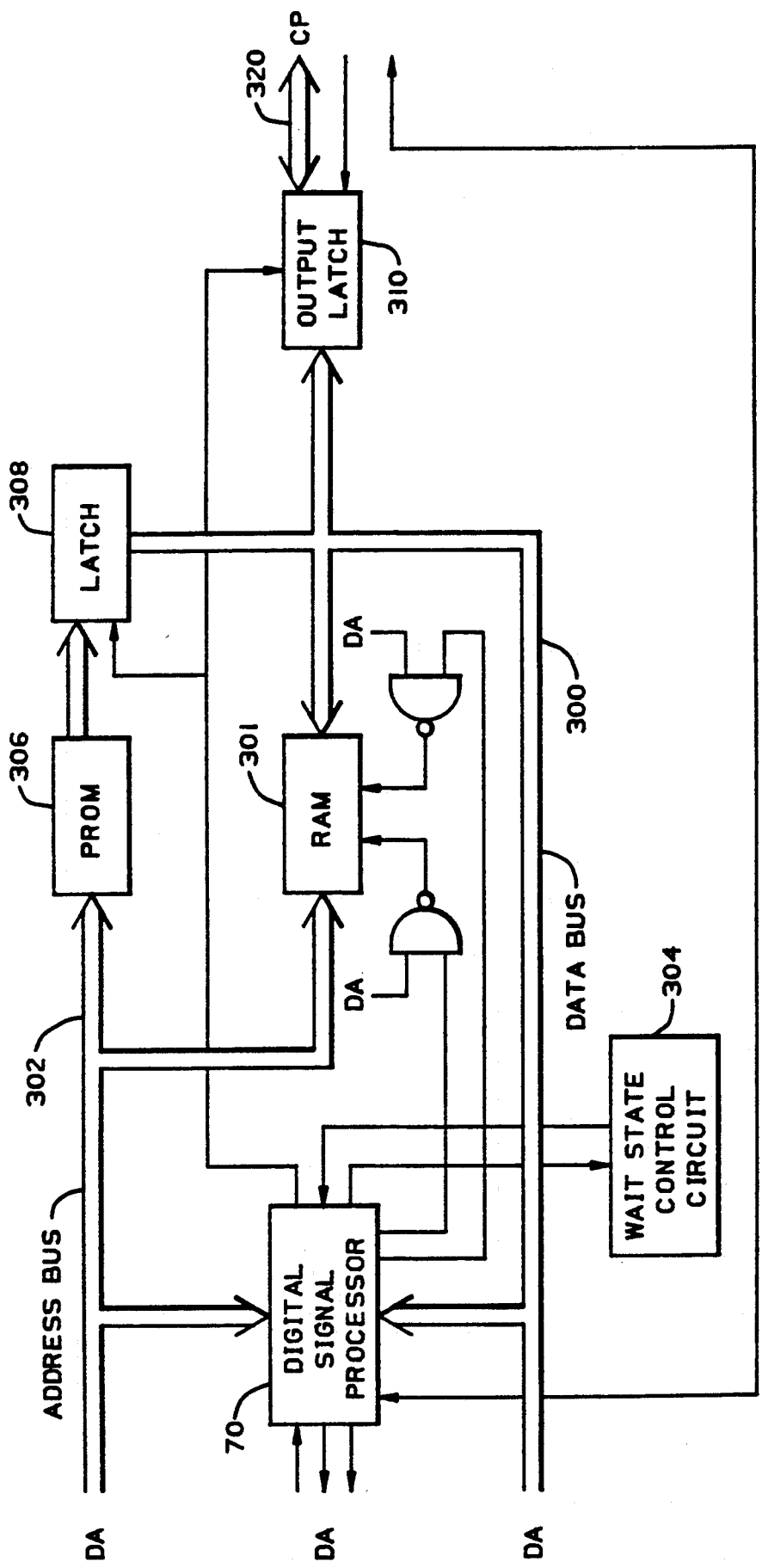
FIG. 6 illustrates the details of the digital signal processing section 22 of FIG. 1.

At the beginning of a DMA transfer, the digital signal processor 70 (FIG. 6) receives the DMA hold command from the data acquisition section 20 and acknowledges same after a suspension of operations. A suitable digital signal processor is available from Texas Instruments as a TMS32020 processor. During a DMA transfer, the write enable signal is applied to RAM 301 and the data sample on databus 300 is stored at the address on address bus 302. Normal memory operations are directed by a wait state control circuit 304 for both PROM 306 and RAM 301. A suitable wait state control circuit is described in the TMS32020 user's guide, by Texas Instruments.

When all the samples have been stored in RAM 301, the digital signal processor 70, after receiving a command from the control section 16, performs appropriate digital signal processing on the samples. The control program for performing the processing is originally stored in programmable read only memory (PROM) 306 and is transferred from memory 306 to RAM 301 because the RAM 301 is faster, allowing a higher execution speed by the processor 70. The result of the processing is output to the control processor 24 through output latch 310 over parallel data bus 320 using an interrupt handshaking scheme in which acknowledgement of receipt of a transfer to the processor 24 is indicated by interrupting the processor 70. Transfers to processor 70 are acknowledged in the same way. The output latch 310 is a bi-directional latch allowing a new digital signal processing program, as well as commands, to be transferred to the digital signal processor 70. A suitable PROM is a 27C64 available from Intel, a suitable RAM is a 62256, available from Hitachi, while suitable unidirectional and bi-directional latches can be created from 74HC373 latches.

The process performed by the digital signal processor 70, illustrated in FIGS. 7A-7E, begins by setting 350 defaults and performing other processing such as the transfer of control programs from PROM to RAM, mentioned above. Next, the processor 70 awaits 352 an interrupt indicating that a command has been stored in output latch 310. When the command is received, it is checked 354 to determine whether it is a valid command and if not, an error message is sent 356 to the control processor 24. If it is a valid command, the command is added 358 to a command list which could be several commands long. The test would include a first command for selecting and sampling a particular sensor taking, for example, 128 samples, followed by a command to perform a function, such as averaging the samples, and followed by a command to output the results to the control processor 24. If the command is not 360 the last command, the process loops back to await 352 the next command. If it is the last command, the command list is processed 362 in order of receipt. When all commands have been processed, a completion message is sent 364 to the control processor 24.

Figures 7A, 7B:
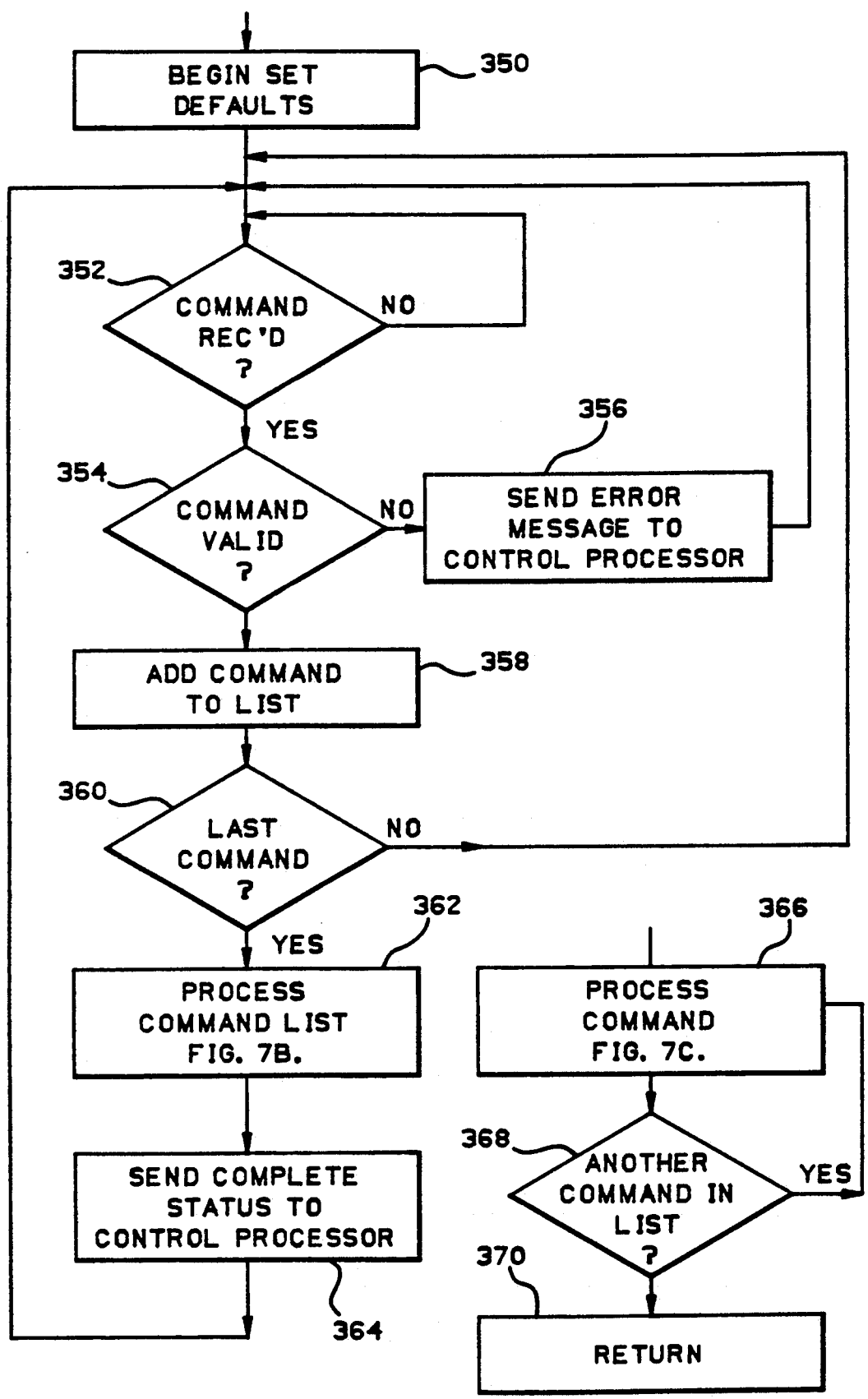
FIGS. 7A-7E depict the process performed by the digital signal processor 70 of FIG. 6.

FIG. 7B illustrates the loop for processing the command list. The first command on the list is processed 366 followed by a determination 368 as to whether another command is on the list. If not, a return 370 occurs.

Figure 7C:
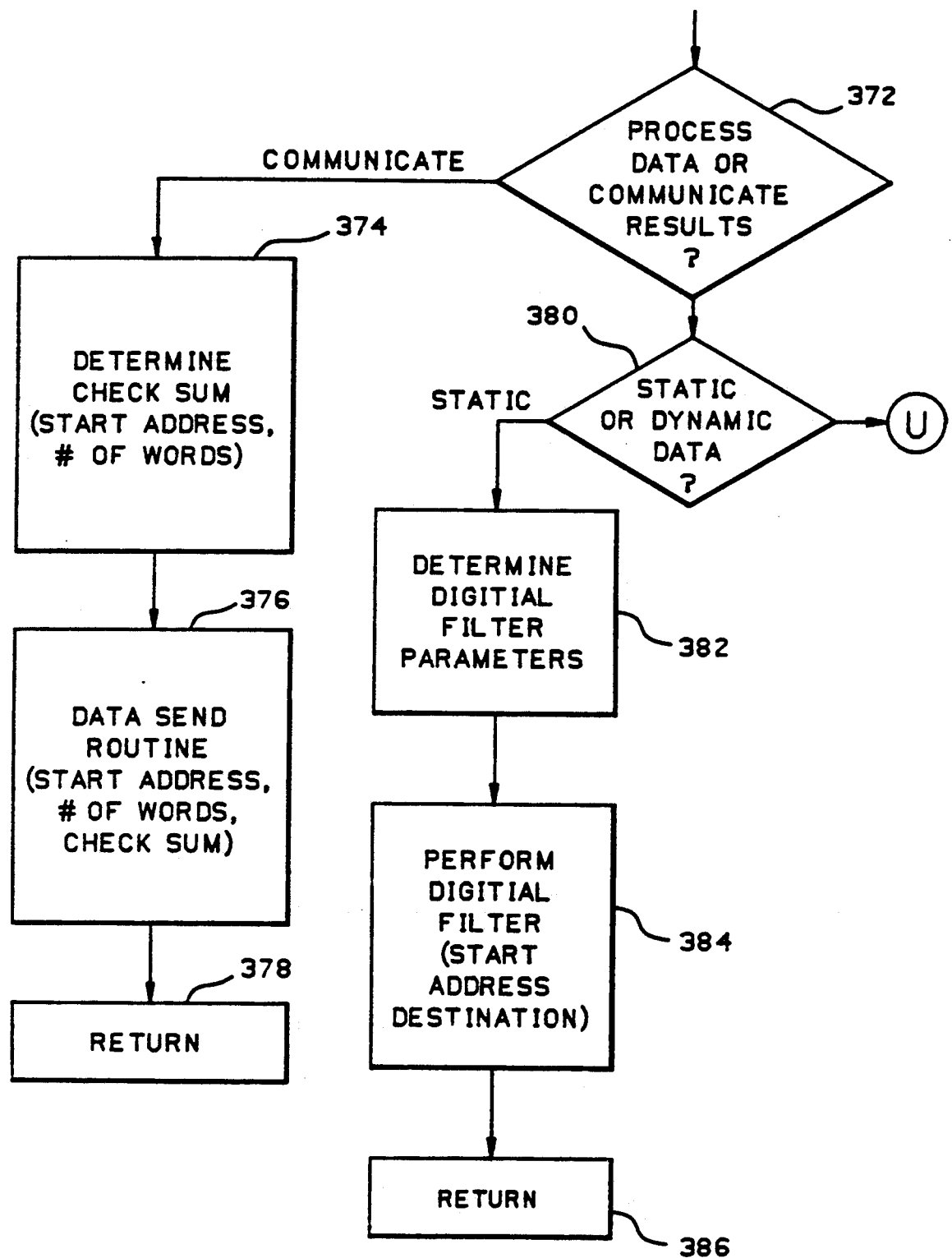
Figure 7D:
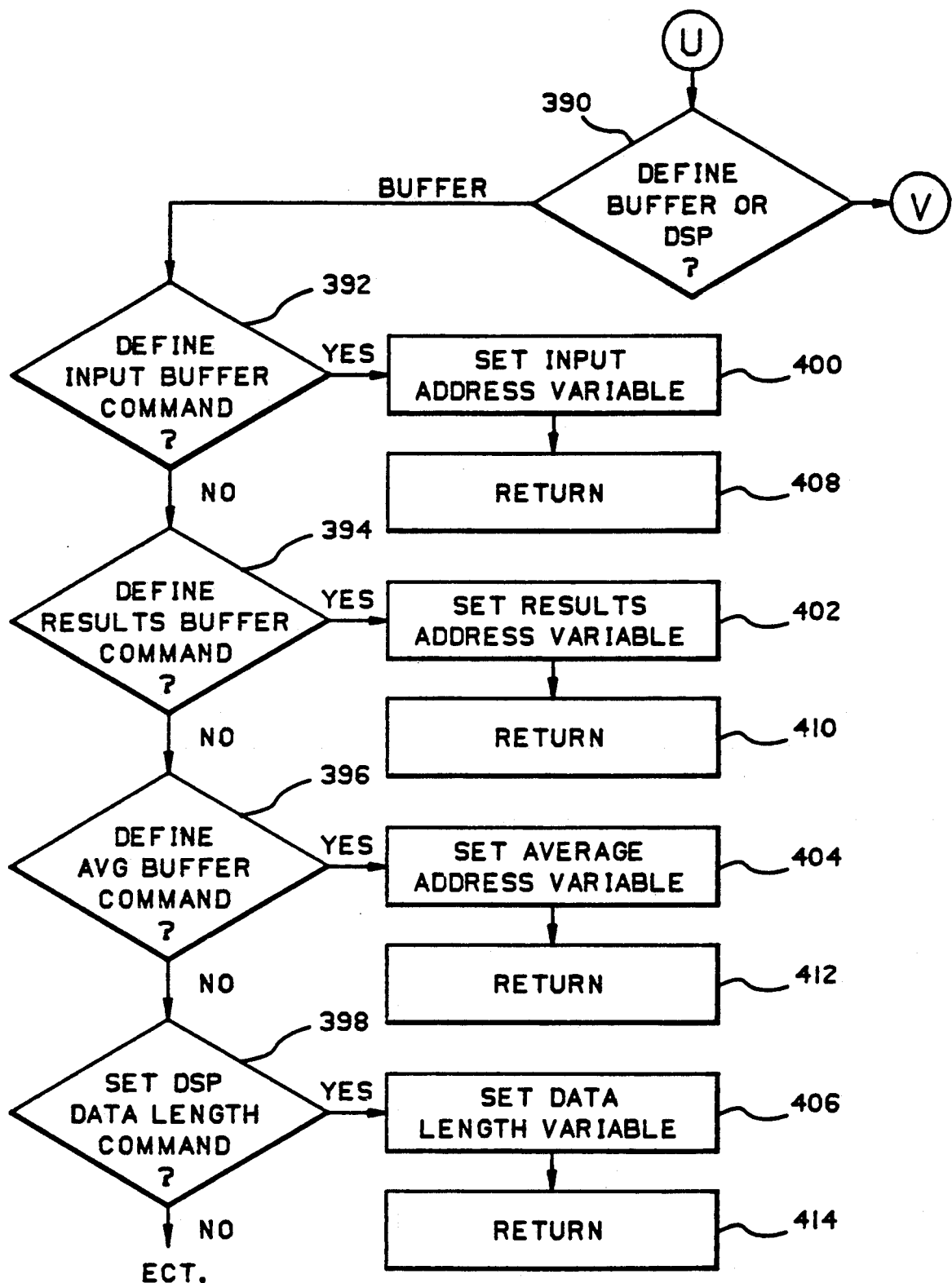

FIG. 7C illustrates the steps of block 366 performed for processing the commands. First, a determination 372 is made as to whether the command is to process data or communicate results. If communication is the task, the processor 70 produces 374 a check sum for the data to be transmitted to processor 24, attaches the check sum to the data to be sent and calls a data send routine which merely outputs the data one word at a time through latch 310 each time a handshaking interrupt is received from processor 24. This routine can be provided by one of ordinary skill in the art. A return then occurs 378.

If the command does not indicate that results should be communicated, a determination is made 380 as to whether the process is a static process. If the process is a static process (by static process, we mean a very low frequency signal of less than 10 Hz), the parameters of the digital filter for the collected data are determined 382 in accordance with the type of sensor signal stored. These parameters are stored in a table that correlates sensors with filter characteristics. Next, an appropriate filter routine is performed 384 followed by a return 386.

If the process data command is for dynamic data, a determination is made 390 (FIG. 7D) concerning whether the command specifies that a buffer should be defined. If digital signal processing buffers, such as input and output buffers, should be defined, determinations are made 392-398 as to the type of buffer definition. Appropriate set functions are performed 400-406 for the appropriate command followed by a return 408-414. The definition 392 of an input buffer determines where data from the data acquisition section 20 will be found. A results buffer must be defined for placement of data from a single digital signal processing operation. This also must be defined before any DSP command is executed. Since the digital signal processor 70 may be directed to average results from several signal processing operations, an averaging buffer must be defined 396 for such data storage. The lengths of all previously specified buffers will be set 398 by a data length command.

Figure 7E:
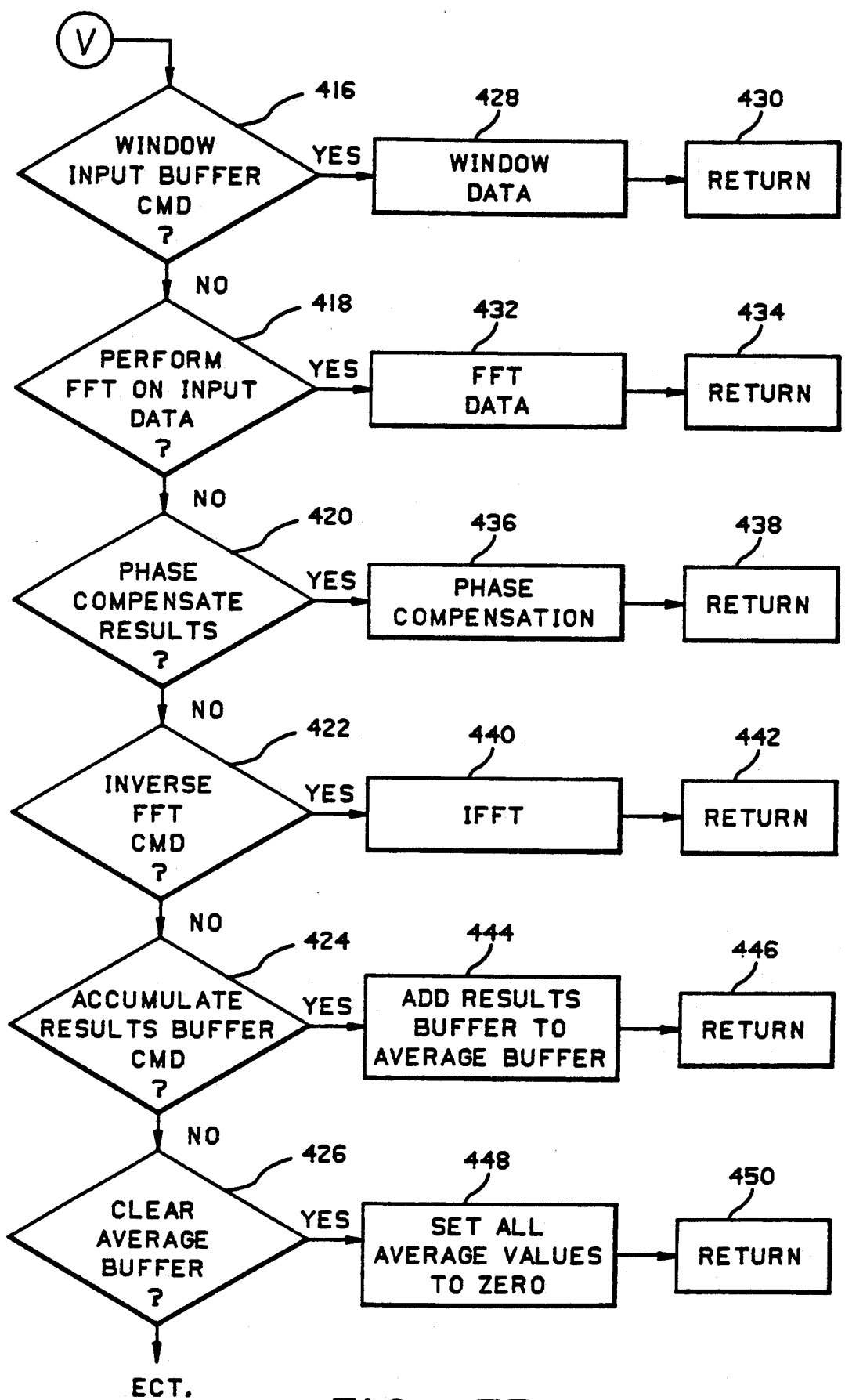

If the command is a dynamic digital signal processing command, the type of command is determined 416-426 (FIG. 7E) in accordance with the type of process that is to be performed. If the command is a window command, the data is modified by the appropriate window 428, followed by return 430. If a Fast Fourier Transform is the command, a Fast Fourier Transform is performed 432 followed by a return 434. If a phase compensation command for a phase shift between 0° and 360° is input, phase compensation is performed 436 followed by a return 438. If the command indicates an Inverse Fast Fourier transform should be performed, it is performed 440 followed by a return 442. If the command is to accumulate results in a buffer, then the results are accumulated 444 followed by return 446. If the command indicates that an average be set to zero, this is performed 448, followed by return 450. As indicated at the bottom of FIG. 7E, other types of dynamic digital signal processing commands can be performed by merely adding the appropriate routines to the routines stored in the memory 306.

Figure 8:
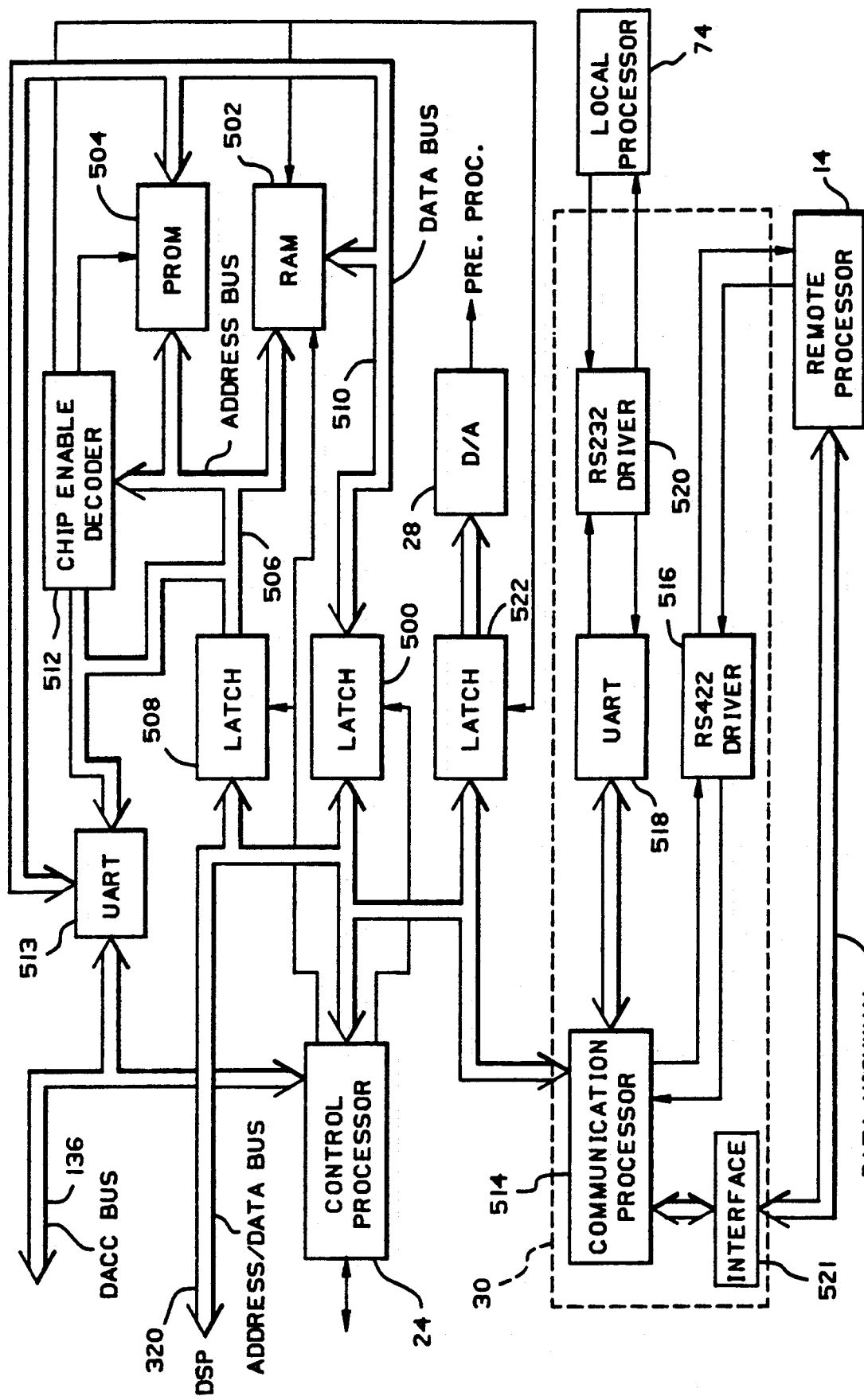
FIG. 8 depicts the details of the control section 16 of FIG. 1.

When the digital signal processor has loaded any of the variable number of 16 bit output results in output latch 310, an interrupt is communicated to the control section 16 control processor 24, illustrated in FIG. 8. The control processor 24 is preferably an 8096 processor available from Intel. The results on address/databus 320 are passed through latch 500 are available to the control processor 24. All operations of the processor 24 are controlled by the PROM 504 and RAM 502. Suitable random access memory is available from Hitachi as a 62256 RAM and a suitable programmable read only memory is a 27C64 chip. The addresses for retrieving the program from ROM 504 and data or programs from RAM 502 are retrieved based on an address transferred over address bus 506 through latch 508. The address latch 508 is a single direction latch such as a 74HC373. Program instructions or data are transferred back to the control processor 24 through the data latch 500 which is preferably a commonly available bi-directional latch 74HC245.

When it is necessary for the control processor 24 to access a peripheral device, the control processor 24 produces chip enable signals through chip enable decoder 512. The control processor 24 serially communicates commands to the data acquisition section 20 using a commonly available UART 513 connected to channel 136. When it is necessary for the control processor to communicate with the digital signal processor 70, such communications are performed over the combined parallel address/data bus 320. When the control processor 24 communicates with the remote processor 14, the local output or the data highway, such is performed through the communication interface 30 which includes a communication processor 514 such as an 8044 chip with an on-chip synchronous communications controller, available from Intel. The processor 514 may communicate to the remote processor using the on-chip synchronous communications controller through a commonly available generic RS422 driver 516 which is suitable for interfacing with a bus connected to several computers. When the communications processor 514 communicates through the local output, a universal asynchronous receiver/transmitter such as an XL88C681 available from Exar is used along with an RS232 line driver such as an MAX232, available from Maxim. Communications may also be directed to the remote processor 14 over the sensor data highway through a sensor data highway interface 521.

Occasionally, the control processor 24 will perform a diagnostic test on the entire system to determine whether the sensor preprocessing section 10, data acquisition section 20 and digital signal processing section 22 are performing properly. To perform such a test, the control processor 24 loads a known digital value into latch 522, enables the transfer of the latch contents to D/A converter 28 through chip enable decoder 512 along with transferring appropriate enable signals over the data acquisition control channel bus 136 and address/data bus 320 to control the various sections. The digital-to-analog converter 28 is connected to one of the input ports of the input multiplexer 42 in the sensor preprocessing section 18. The predetermined signal is conditioned by the sensor preprocessing section 18, sampled by the data acquisition section 20, and analyzed by the digital signal processing section 22. The results of the test signal analysis are compared with the predicted results by control processor 24 and maintenance is signaled whenever the two values do not agree, that is, when the difference is outside an acceptable error threshold.

Figure 9E:
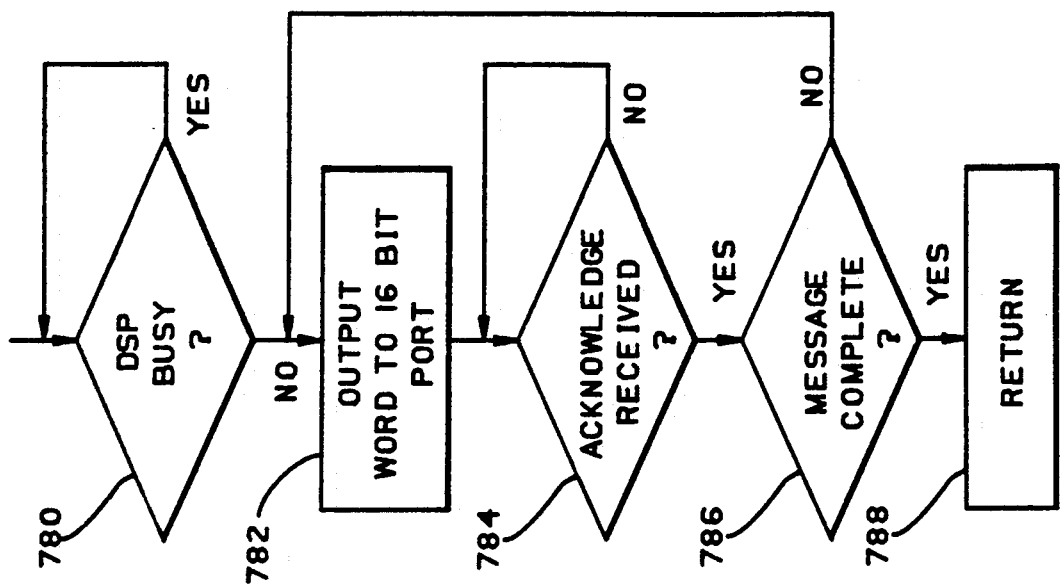
FIGS. 9AI-9E depict the process performed by the control processor 24 of FIG. 8.

FIG. 9A illustrates the main process performed by the control processor 24. First, the process determines 600 which external communication ports should be active and then sends 602 a reset to the active ports. The control processor 24 next determines whether default processing for the PROM 504 has been performed. If not, default processing which includes retrieving the control program to be stored in the RAM 502 is performed 606. When the appropriate program is loaded and the tasks to be performed by the control processor 24 are defined, the control processor enters a loop for controlling data sampling.

At the beginning of the loop, the processor 24 determines 608 which sensor task to process next be examining a sensor sampling sequence table. The sequence table is previously stored in PROM 504 or can be downloaded from the processor 14 and includes the settings for gain and cutoff frequency as well as the multiplexer channels and the number of samples which are necessary along with the sampling rate. The processor 24 then accumulates this information into a command which is serially sent 610 to the sampling control computer 50, after which the processor 24 awaits 612 a communication from the sampling control computer 50, indicating that the acquisition of the number of data points specified has been performed. The processor 24 then sends 614 a command initiating appropriate processing by the digital signal processor 70 over the bus 320. The type of processing can also be stored in the sequence table. Next, the processor waits 616 until the digital signal processor 70 provides an indicator that the processing is complete. Once the digital signal processing is complete, control processor 24 determines 618 whether the results should be retrieved by the control processor 24 by, for example, comparison with a threshold from the sequence table or a comparison to prestored reference values for the signal. If not, the processor 24 updates 620 the task scheduler to reflect that the task associated with the designated sensor has been completed and then determines 622 whether an input communication through the communications interface 30 has been requested. If so, the input communications routine of FIG. 9D is called 624. If not, a determination is made 626 concerning whether processing should be stopped. If processing should be stopped, the processor 24 enters a state 628 which waits for a start processing interrupt. If not, the loop for sensor sampling continues by taking 608 the next sensor designation from the sequence table.

Figure 9C:
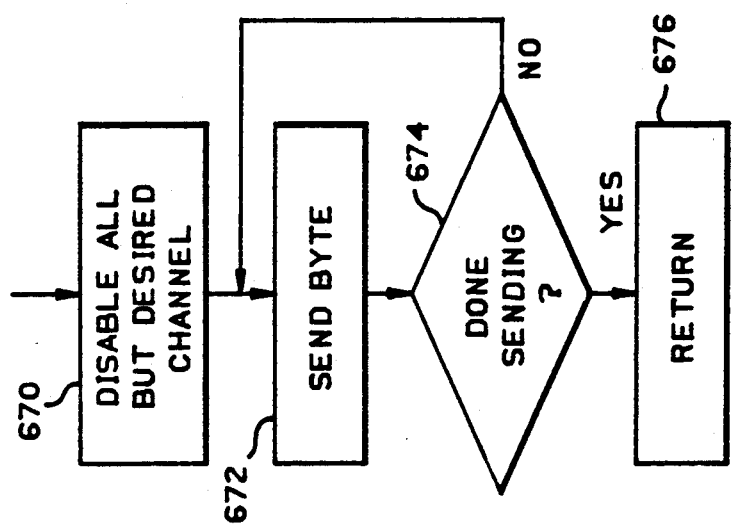
Figure 9B:
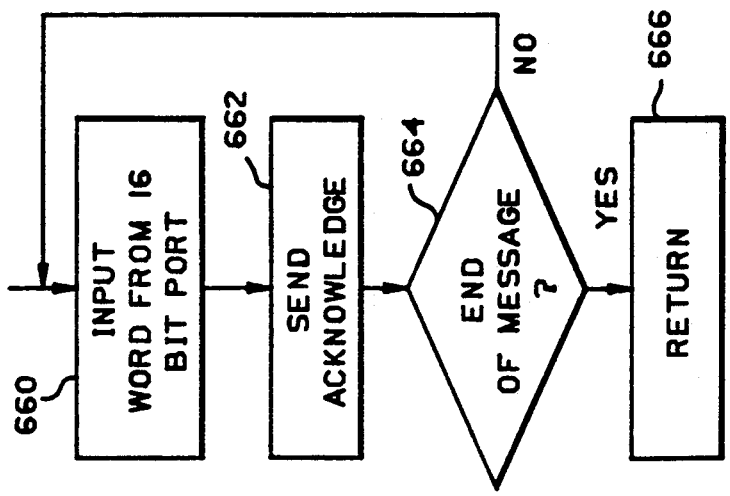

If the results of analysis processing need to be received by the control processor 24, a request is sent 630 to the processor 70, after which the routine for receiving data from the digital signal processor 70, set forth in FIG. 9B is called 632. If the data from the digital signal processor 70 after receipt needs to be converted into appropriate engineering units, this is performed 634 after which a determination is made 636 concerning whether the processed data should be transmitted to the remote processor 14, the local port or the data highway. If so, the output communication routine of FIG. 9C is called 638.

It is also possible for the control processor 24 to perform further analysis on the received data and a determination is made 640 whether such is needed. If so, the data is analyzed 642 by, for example, comparing the received data to minimum and maximum values (thresholds) and to other sensor values and a determination is made 644 concerning whether a warning should be sent to the remote processor 14. If so, the output communications routine of FIG. 9C is called 646.

The communication routine for receiving data from the digital signal processor is illustrated in FIG. 9B. This routine starts by inputting 660 the word from the address/databus 320 and sending 662 an acknowledgement to the processor 70. The acknowledgement is preferably an interrupt but could be a command word. The first word in the communication from the digital signal processor 70 can indicate the length of the message or a special end of message word can be sent later. The control processor 24 determines 664 whether the end of the message has been received. If not, the process continues. If the end of the message has been received, a return 666 occurs.

The external communications output routine of FIG. 9C starts by disabling 670 all channels, except the channel over which the communication is to occur, by sending a disable command to processor 514. The processor 24 then sends 672 the message one byte at a time until the message is complete 674. An appropriate communications protocol should be used. After the message is sent, a return 676 occurs.

The input communication routine, illustrated in FIG. 9D, starts with an acknowledgement to the communications processor 514 of the request for communications. Next, a command is sent 682 to the communications processor 514, indicating that all channels except the channel over which the message is received should be disabled. Next, the control processor 24 receives 684 the message from the communications processor 514. The message is examined to determine whether the check sum is correct 686 and if not, an error indication is sent 688 to the communications processor 514 which transfers same to the appropriate communicating device. A return occurs 690 which includes the enabling of all channels using an appropriate command to processor 514.

If the received message includes data 692 to be loaded into the control processor memory 502, the data is moved 694 to the appropriate memory location followed by a return 696 which enables all disabled channels. If the data is to be downloaded 698 to the digital signal processor 70, the message is constructed 700 for the DSP 70 and the communications routine for communicating with the processor 70 is called 702 followed by return 704 which enables all disabled channels. If the message indicates that processing should stop 704, the stop processing flag is set 706 followed by a return that enables all disabled channels. If the data is sensor processing task information 710, the appropriate table in memory 502 is updated 712 followed by a return 714 which enables all disabled channels. If the message indicates that a particular specialized task should be activated or deactivated 716, the appropriate status is set. Such a task might be to change the type of analysis done by the control processor 24 to determine whether a component is malfunctioning. The status set is followed by a return 720 which enables all disabled channels.

This system could be improved by implementing an expert diagnosis system in the control section 16. As previously discussed, the preprocessing modules 40 include switched capacitor filters, requiring the anti-aliasing circuitry associated with multiplexers 94 and 95. The anti-aliasing circuitry, along with the clock section, could be eliminated if switched capacitor filters are not used. The substitute filter would need 18 poles at the different cutoff frequencies. In the data acquisition section, if the digital signal processor is too busy to accept a DMA request, the data sample will be lost when the next sampling clock is produced. It is possible to provide a storage buffer capable of storing at least 16 samples so that data will not be lost in such a situation. Rather than downloading control and digital signal processing programs, it is possible, if cost is not really a factor, to increase the memory storage capacity by either expanding the read only memory or adding slower storage devices, such as magnetic bubble memories or floppy disk drives.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

We claim:

1. A smart sensor system, comprising:
   one or more sensors for a monitored component;
   a remote processor for processing and analyzing sensor signals from said one or more sensors;
   a communication link connected to said remote processor; and
   a component monitor connected to said communication link, located physically in association with the monitored component and located physically remotely with respect to said remote processor, said monitor including at least
   conditioning and multiplexing means for conditioning and selecting one of the sensor signals, wherein said conditioning and multiplexing means includes at least one sensor preprocessing module, each sensor preprocessing module including at least
   a channel selection latch for storing a channel selection signal;
   an input multiplexer, operatively connected to said channel selection latch, for receiving the sensor signals from said one or more sensors and for selecting one of the sensor signals as a selected sensor signal based on the channel selection signal;
   a gain control latch for storing a gain control value;
   a programmable gain control amplifier, operatively connected to said input multiplexer and said gain control latch, for amplifying the selected sensor signal based on the gain control value and for outputting an amplified signal;
   a frequency selection latch for storing a frequency selection value;
   a switching unit, operatively connected to said frequency selection latch and said programmable gain control amplifier, for receiving the amplified signal and outputting a differential signal;
   clock signal generating means for outputting a clock signal in dependence upon the frequency selection value; and
   a programmable filter, operatively connected to said switching unit, for lowpass filtering the differential signal based on the clock signal and for outputting a preprocessed sensor signal;

conversion means for converting the sensor signals into digital samples;

signal analysis means for processing and analyzing the digital samples; and control means for designating selection, conditioning and acquisition of sensor signals, designating a type of analysis performed on the digital samples, performing sensor signal analysis to determine and indicate pending sensor, component and component monitor failure and communicating the results of the analysis to said remote processor over said communications link.

2. A system as recited in claim 1, wherein said conversion means includes a sampling control computer, and wherein the gain control value and the frequency selection value are determined by said sampling control computer.

3. A system as recited in claim 1, wherein said clock signal generating means selects a clock frequency for the clock signal from a plurality of predetermined clock frequencies in dependence upon the frequency selection value stored in said frequency selection latch.

4. A system as recited in claim 2, wherein said sampling control computer comprises:

means for receiving a command;

means for determining whether the command indicates at least one of the channel selection signal, the frequency selection value and the gain control value;

means for setting the frequency selection signal in said frequency selection latch;

means for setting the gain control value in said gain control latch; and means for setting the channel selection signal in said channel selection latch.

5. A system as recited in claim 4, wherein said conversion means further comprises first and second sample and hold circuits for sampling and holding preprocessed sensor signals, and wherein said sampling control computer further comprises:

means for determining whether the command requests sampling of a single channel or dual channels; and means for selecting, when the command requests sampling of the signal channel, one of said first and second sample and hold circuits to perform sampling of the preprocessed sensor signal.

6. A system as recited in claim 5, wherein said conversion means further comprises analog-to-digital conversion means, operatively connected to said first and second sample and hold circuits and said sampling control computer, for receiving the preprocessed sensor signal and converting the preprocessed sensor signal into a digital sample, and wherein said signal analysis means comprises a digital signal processor operatively connected to said analog-to-digital conversion means, for processing the digital samples based on processing commands provided by said control means.

7. A smart sensor system, comprising:

one or more sensors for a monitored component;

a remote processor for processing and analyzing sensor signals from said one or more sensors;

a communication link connected to said remote processor; and a component monitor connected to said communication link, located physically in association with the monitored component and located physically remotely with respect to said remote processor, said monitor component including conditioning and multiplexing means for conditioning and selecting one of the sensor signals, said conditioning and multiplexing means includes at lest one sensor preprocessing module, each sensor preprocessing module includes a channel selection latch for storing a channel selection signal;

an input multiplexer, operatively connected to said channel selection latch, for receiving the sensor signals from said one or more sensors and for selecting one of the sensor signals as a selected sensor signal based on the channel selection signal;

a gain control latch for storing a gain control value;

a programmable gain control amplifier, operatively connected to said input multiplexer and said gain control latch, for amplifying the selected sensor signal based on the gain control value and for outputting an amplified signal;

a frequency selection latch for storing a frequency selection value;

a switching unit, operatively connected to said frequency selection latch and said programmable gain control amplifier, for receiving the amplified signal and outputting a differential signal;

clock signal generating means for outputting a clock signal in dependence upon the frequency selection value; and a programmable filter, operatively connected to said switching unit, for lowpass filtering the differential signal based on a clock signal and for outputting a preprocessed sensor signal;

conversion means for converting the sensor signals into digital samples, said conversion means includes first and second sampling and hold circuits, and a sampling control computer for determining the gain control value and the frequency selection value, said sampling control computer comprises includes means for receiving a command;

means for determining whether the command indicates at least one of the channel selection signal, the frequency selection value and the gain control value;

means for setting the frequency selection signal in said frequency selection latch;

means for setting the gain control value in said gain control latch;

means for setting the channel selection signal in said channel selection latch;

means for determining whether the command requests sampling of a single channel or dual channels; and means for selecting, when the command requests sampling of the signal channel, one of said first and second sample and hold circuits to perform sampling of the preprocessed sensor signal;

signal analysis means for processing and analyzing the digital samples; and control means for designating selection, conditioning and acquisition of sensor signals, designating a type of analysis performed on the digital samples, performing sensor signal analysis to determine and indicate pending sensor, component and component monitor failure and communicating the results of the analysis to said remote processor over said communications link.

8. A smart sensor system, comprising:
one or more sensors for a monitored component;
a remote processor for processing and analyzing sensor signals from said one or more sensors;
a communication link connected to said remote processor;
a component monitor connected to said communication link, located physically in association with the monitored component and located physically remotely with respect to said remote processor, said monitor including at least
conditioning and multiplexing means for conditioning and selecting one of the sensor signals, said conditioning and multiplexing means includes at least one sensor preprocessing module, each sensor preprocessing module including at least
a channel selection latch for storing a channel selection signal;
an input multiplexer, operatively connected to said channel selection latch, for receiving the sensor signals from said one or more sensors and for selecting one of the sensor signals as a selected sensor signal based on the channel selection signal;
a frequency selection latch for storing a frequency selection value; and
a switching unit, operatively connected to said frequency selection latch, for receiving the selected sensor signal and outputting a differential signal;
conversion means for converting the sensor signals into digital samples;
signal analysis means for processing and analyzing the digital samples; and
control means for designating selection, conditioning and acquisition of sensor signals, designating a type of analysis performed on the digital samples, performing sensor signal analysis to determine one of pending sensor and component failure, and communicating the results of the analysis to said remote processor over said communications link.

9. A system as recited in claim 8,
wherein said conversion means includes a sampling control computer, and
wherein the frequency selection value is determined by said sampling control computer.

10. A system as recited in claim 9, wherein said sampling control computer comprises:
means for receiving a command;
means for determining whether the command indicates at least one of the channel selection signal and the frequency selection value;
means for setting the frequency selection signal in said frequency selection latch; and
means for setting the channel selection signal in said channel selection latch.

11. A system as recited in claim 10,
wherein said conversion means further comprises first and second sample and hold circuits for sampling and holding preprocessed sensor signals, and
wherein said sampling control computer further comprises:
means for determining whether the command requests sampling of a single channel or dual channels; and
means for selecting, when the command requests sampling of the signal channel, one of said first and second sample and hold circuits to perform sampling of the preprocessed sensor signal.

12. A system as recited in claim 10,
wherein each sensor preprocessing module further comprises:
a gain control latch for storing a gain control value;
a programmable gain control amplifier, operatively connected to said input multiplexer and said gain control latch, for amplifying the selected sensor signal based on the gain control value and for outputting an amplified signal;
clock signal generating means for outputting a clock signal in dependence upon the frequency selection value; and
a programmable filter, operatively connected to said switching unit, for lowpass filtering the differential signal based on the clock signal and for outputting a preprocessed sensor signal, and
wherein said switching unit receives the amplified signal and outputs the differential signal.

13. A system as recited in claim 12, wherein said clock signal generating means selects a clock frequency for the clock signal from a plurality of predetermined clock frequencies in dependence upon the frequency selection value stored in said frequency selection latch.

14. A system as recited in claim 8, wherein said conversion means comprises:
sampling control means for receiving sensor selection and conditioning information from said control means and providing the information to said conditioning and multiplexing means;
sample and hold means, controlled by said sampling control means, for sampling and holding the sensor signals;
multiplexer means, controlled by said sampling control means, for selecting one of the sampled and held sensor signals;
analog-to-digital conversion means, controlled by said sampling control means, for converting the selected sensor signal into the digital sample; and
transfer means for transferring the digital sample to said signal analysis means.

15. A system as recited in claim 14, wherein said transfer means comprises:
a direct memory access control circuit connected between said sampling control means and said signal analysis means; and
address and data latches connected between said sampling control means, said analog-to-digital conversion means and said signal analysis means.

16. A system as recited in claim 8, wherein said signal analysis means comprises:
storage means for storing the digital samples; and
a digital signal processor connected to said storage means and processing the digital samples based on processing commands provided by said control means.

17. A system as recited in claim 8, wherein said control means comprises:
a control processor, connected to said conversion means and said signal analysis means, for providing processing commands to said signal analysis means and sensor selection and conditioning information to said conversion means and for performing analysis of outputs produced by said signal analysis means; and interface means for communicating between said control processor and the remote processor.

18. A system as recited in claim 8, wherein said control means includes test signal means for providing a test signal to said conditioning and multiplexing means.

* * * * *